(12) United States Patent
Phares

(10) Patent No.: US 12,508,624 B2
(45) Date of Patent: Dec. 30, 2025

(54) SYSTEMS AND METHODS FOR DRY POWDER COATING LAYERS OF AN ELECTROCHEMICAL CELL

(71) Applicant: Dragonfly Energy Corp., Reno, NV (US)

(72) Inventor: Denis Phares, Reno, NV (US)

(73) Assignee: Dragonfly Energy Corp., Reno, NV (US)

(*) Notice: Subject to any disclaimer, the term of this patent is extended or adjusted under 35 U.S.C. 154(b) by 152 days.

(21) Appl. No.: 17/962,417

(22) Filed: Oct. 7, 2022

(65) Prior Publication Data

US 2023/0033696 A1 Feb. 2, 2023

Related U.S. Application Data

(62) Division of application No. 16/874,004, filed on May 14, 2020, now Pat. No. 11,491,508.

(Continued)

(51) Int. Cl.
*B05D 1/02* (2006.01)
*B05C 5/00* (2006.01)
(Continued)

(52) U.S. Cl.
CPC .............. *B05D 1/02* (2013.01); *B05C 5/00* (2013.01); *B05C 19/00* (2013.01); *B05C 19/04* (2013.01); *B05C 21/005* (2013.01); *B41F 15/405* (2013.01); *H01M 4/0419* (2013.01); *H01M 4/0435* (2013.01); *H01M 4/0471* (2013.01); *H01M 4/139* (2013.01); *H01M 10/0525* (2013.01); *H01M 10/0585* (2013.01); *B05C 19/02* (2013.01)

(58) Field of Classification Search
None
See application file for complete search history.

(56) References Cited

U.S. PATENT DOCUMENTS 3,634,161 A * 1/1972 Schimmer ............ H01L 21/78
    438/749
4,041,898 A    8/1977 Tajima
(Continued)

FOREIGN PATENT DOCUMENTS

CN    87101108 A    3/1988
CN    104303343 A    1/2015
(Continued)

OTHER PUBLICATIONS

International Search Report and Written Opinion mailed Jul. 29, 2020 for International Application No. PCT/US2020/032836.

*Primary Examiner* — Michael P. Rodriguez
(74) *Attorney, Agent, or Firm* — Wolf, Greenfield & Sacks, P.C.

(57) ABSTRACT

A system for forming a particle layer on a substrate may include at least one sprayer and at least two masks configured to selectively mask a substrate in a first region and second region of the substrate. The at least one sprayer may be configured to spray particles at the substrate, where the at least two masks maintain the first region and second region substantially free of the deposited material. A heater may be employed to heat the substrate as the particles are sprayed by the at least one sprayer onto the substrate.

21 Claims, 11 Drawing Sheets

Related U.S. Application Data

(60) Provisional application No. 62/848,849, filed on May 16, 2019.

(51) Int. Cl.
*B05C 19/00* (2006.01)
*B05C 19/04* (2006.01)
*B05C 21/00* (2006.01)
*B41F 15/40* (2006.01)
*H01M 4/04* (2006.01)
*H01M 4/139* (2010.01)
*H01M 10/0525* (2010.01)
*H01M 10/0585* (2010.01)
*B05C 19/02* (2006.01)

(56) References Cited

U.S. PATENT DOCUMENTS

| | | | |
|---|---|---|---|
| 4,067,291 A | 1/1978 | Park | |
| 4,095,557 A | 6/1978 | Croop et al. | |
| 4,697,966 A * | 10/1987 | Baur | B23F 23/1212 |
| | | | 409/60 |
| 5,278,442 A | 1/1994 | Prinz et al. | |
| 5,334,411 A | 8/1994 | Pepin | |
| 5,925,897 A | 7/1999 | Oberman | |
| 6,326,090 B1 * | 12/2001 | Schultz | H10N 50/85 |
| | | | 428/688 |
| 7,432,187 B1 | 10/2008 | Cok | |
| 8,927,068 B2 | 1/2015 | Brown et al. | |
| 11,491,508 B2 | 11/2022 | Phares | |
| 2004/0156724 A1 * | 8/2004 | Torigoe | C23C 4/073 |
| | | | 416/241 R |
| 2004/0209190 A1 | 10/2004 | Mori et al. | |
| 2005/0025899 A1 * | 2/2005 | Byrnes | B05B 12/20 |
| | | | 118/500 |
| 2012/0064225 A1 | 3/2012 | Bachrach et al. | |
| 2013/0263393 A1 * | 10/2013 | Mazumder | H02S 40/10 |
| | | | 427/535 |
| 2013/0309414 A1 | 11/2013 | Eskra et al. | |
| 2013/0323583 A1 | 12/2013 | Phares | |
| 2014/0368804 A1 | 12/2014 | Lafarre et al. | |
| 2015/0217308 A1 | 8/2015 | Toyoshima | |
| 2015/0372286 A1 | 12/2015 | Bolandi et al. | |
| 2016/0006018 A1 * | 1/2016 | Wang | H01M 4/0471 |
| | | | 427/126.6 |
| 2017/0099737 A1 | 4/2017 | Kajiyama et al. | |
| 2017/0191163 A1 | 7/2017 | Tao et al. | |
| 2017/0331100 A1 | 11/2017 | Phares et al. | |
| 2018/0061638 A1 | 3/2018 | Yamazaki et al. | |
| 2020/0144591 A1 | 5/2020 | Wang et al. | |
| 2020/0365872 A1 | 11/2020 | Phares | |

FOREIGN PATENT DOCUMENTS

| | | |
|---|---|---|
| CN | 107615557 A | 1/2018 |
| JP | 2012-243395 A | 12/2012 |
| JP | 2014-523624 A | 9/2014 |
| JP | 2016-512384 A | 4/2016 |
| JP | 2016-517139 A | 6/2016 |
| JP | 2016-213106 A | 12/2016 |
| WO | WO 2013/009457 A2 | 1/2013 |

* cited by examiner

SYSTEMS AND METHODS FOR DRY POWDER COATING LAYERS OF AN ELECTROCHEMICAL CELL

RELATED APPLICATIONS

This application is a Divisional and claims the benefit under 35 U.S.C. § 121 of U.S. application Ser. No. 16/874,004, filed May 14, 2020, which claims the benefit of priority under 35 U.S.C. § 119(e) to U.S. Provisional Application Ser. No. 62/848,849, filed May 16, 2019, the disclosures of each of which are incorporated herein by reference in their entirety.

FIELD

Disclosed embodiments are related to systems and methods for dry powder coating layers of an electrochemical cell.

BACKGROUND

Lithium ion batteries typically include two or more electrodes separated by an electrically insulating material that is permeable to the diffusion of lithium ions between the electrodes. In some instances, one electrode includes an anode material coated onto a copper substrate and the other includes a cathode material coated onto an aluminum substrate. The production of these electrodes is conventionally done using slurry methods, in which the electrochemical materials (e.g. the anode or cathode material) are mixed with a polymer binder (e.g. typically polyvinylidene fluoride PVDF) which is dissolved in an appropriate solvent (e.g. typically N-methyl pyrrolidone). The resulting slurry is coated onto the electrode substrate. Subsequently, the solvent is evaporated and reclaimed to form a dried layer of electrochemical material on the electrode surface. In order to remove all of the solvent from the electrodes prior to assembly into a battery, enormous amounts of time and energy are expended in the use of large conveyor ovens and vacuum dryers that help to dry the deposited slurry.

SUMMARY

In some embodiments, a system for forming a particle layer includes at least one sprayer configured to spray particles towards a substrate, the particles including at least one selected from the group of an electrochemical material, an ionically conductive material, an electrically conductive material, and a separator material. The system also includes a first mask movable to selectively mask the substrate from the particles in a first region of the substrate, and a second mask movable to selectively mask the substrate from the particles in a second region of the substrate, where the at least one sprayer directs the spray of particles towards a portion of the substrate between the first mask and the second mask. The system also includes a heater configured to heat the substrate.

In some embodiments, a method for depositing material layers includes masking a first region of a substrate, masking a second region of the substrate, heating the substrate, and spraying first particles comprising at least one selected from the group of an electrochemical material, an ionically conductive material, an electrically conductive material, and a separator material towards the heated substrate to form a first layer on the substrate.

In some embodiments, a method of forming an electrode includes masking a first region of a substrate to inhibit material deposition on the substrate in the first region, masking a second region of the substrate to inhibit material deposition in the second region, applying first particles comprising at least one selected from the group of an electrochemical material, an ionically conductive material, an electrically conductive material, and a separator material to the substrate to form a first layer, and applying second particles comprising at least one selected from the group of the electrochemical material, the ionically conductive material, the electrically conductive material, and the separator material to the first layer to form a second layer disposed on the first layer.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
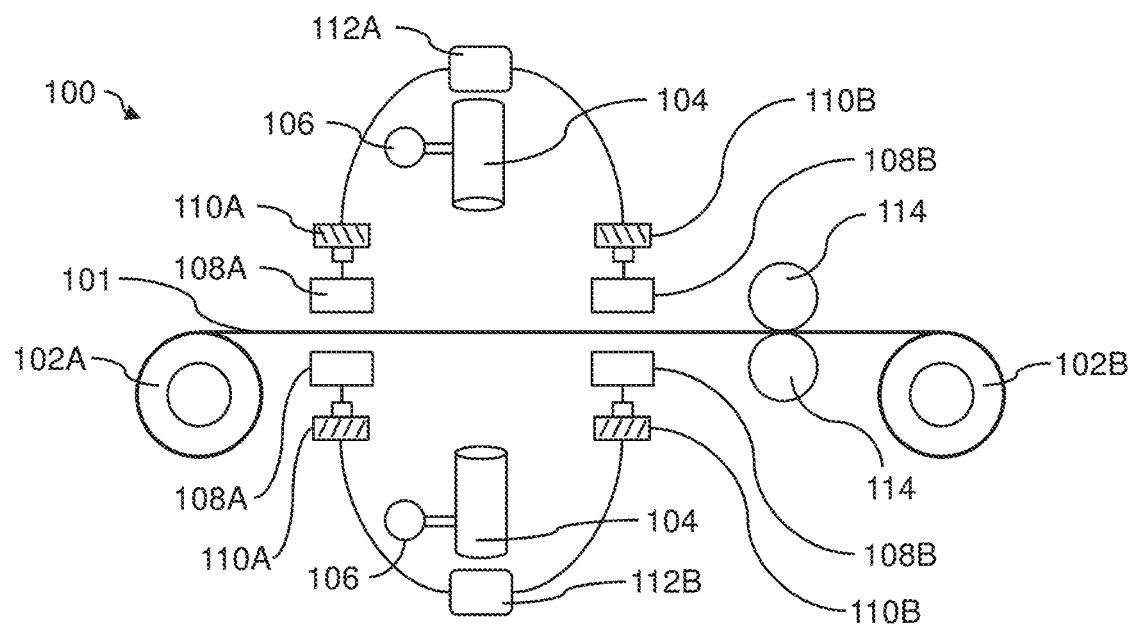
FIG. 1 is a side schematic representation of one embodiment of a spray deposition system.

The inventors have recognized that prior processes for dry powder manufacturing of electrochemical cells have produced continuous lengths of coated material. Specifically, as these processes are performed either continuously or semi-continuously, a uniform coating without gaps is formed on the substrate using these methods. Therefore, forming suitable locations for attaching electrical leads to the current collectors during a battery cell manufacturing process may involve removing some of the deposited material prior to a calendering process. Further, in instances where these processes have used resistively heated substrates, the current passes into and out of the substrate through a bare portion of the substrate and a corresponding coated portion of the substrate which may increase the overall resistance, and thus energy consumption for a battery layer formation process.

In view of the above, the Inventors have recognized the benefits of a system for forming a one or more layers deposited onto a substrate, such as a current collector, of an electrochemical cell in which two or more masks may selectively cover at least a first region and second region of the substrate while a desired material is sprayed, or otherwise applied, on to the substrate to form a layer on the substrate on either one or two opposing surfaces of the substrate (e.g., an electrode layer, a separator layer, a solid state electrolyte layer, etc.). The two or more masks may prevent the first region and second region from being coated by the sprayed material such that the first region and second region are maintained as bare regions of the substrate after deposition of one or more layers thereon. Depending on whether the deposited layers are applied to one or two opposing sides of a substrate, these masks, and the corresponding masked bare regions of the substrate, may be located on one or two opposing surfaces of the substrate. In some embodiments, the bare regions may be used to denote regions where an otherwise continuous roll of substrate may be separated to form individual electrodes. The bare regions may also be used to weld electrical leads to current collectors during a subsequent battery formation process as well.

The Inventors have also recognized the benefits of employing two or more masks in contact with bare regions of a substrate to pass current through the substrate between the masks without passing the current through a layer deposited onto the substrate. Accordingly, the resistive heat generated in the substrate by such a system may be more consistent and more efficient when current is passed directly into and out of the underlying substrate without passing through an intervening layer. This may also restrict an area of heat generation within the substrate to be within a portion of the substrate corresponding to a target region where a material is sprayed onto the substrate between the masks. The inventors have also recognized that such an arrangement may allow multiple layers of different materials to be deposited in series while the substrate is resistively heated through the bare portions maintained by the masks.

In some embodiments, a system for forming a particle layer on a substrate includes at least one sprayer configured to electrically charge and spray particles including at least one selected from the group of an electrochemical material, an ionically conductive material, a separator material, an electrically conductive material, a binder, combinations of the foregoing, and/or any other appropriate material for forming a layer within an electrochemical cell toward a substrate. Regardless, such particles may be used independently or in combination to form an electrode layer (e.g. an anode or cathode), a solid state electrolyte layer, a separator layer, or any other desirable material layer. The system may also include a first mask movable to selectively mask a first region of the substrate from the particles and a second mask movable to selectively mask a second region of the substrate from the particles. The first mask and second mask may be clamps, shields, or other suitable movable bodies which may cover the first and second regions of the substrate from the particles. The first region and second region may be disposed on opposite sides of a target region of the substrate the at least one sprayer is directed towards so that corresponding bare regions of the substrate are disposed on opposing sides of the target region of the substrate coated by the at least one sprayer. Thus, a deposited material layer may be confined to a defined target region along a length of the substrate.

In some embodiments, the above noted system may also include a heater configured to heat the substrate. The first mask and second mask may be configured as first and second electrodes configured to pass current through the substrate between the first and second masks. According to this embodiment, the heater may be configured to pass a current from the first mask to the second mask through the substrate to resistively heat the substrate internally. Though, as detailed further below, embodiments in which different heating methods such as radiative, conductive, and/or convective heating methods are used by one or more heaters to heat a substrate are also contemplated as the disclosure is not so limited.

In some embodiments, a process for depositing a layer of a desired material onto a substrate may include the following. First, a first region and a second region that are spaced from one another along a length of a substrate may be masked. Next, the substrate may be heated (e.g., resistively heated). A plurality of particles may then be sprayed onto the substrate. In some embodiments, the particles may be sprayed without the use of a solvent. Further, in some embodiments, the particles may be a mixture of a first material with a binder, a material pre-coated with a binder, and/or the material itself may be capable of binding to the substrate and/or an underlying layer. Regardless, in one embodiment, the particles may be aerosolized or otherwise turned into a spray of particles directed towards a target region of the substrate in any appropriate fashion. In some instances, the aerosolized particles may be appropriately charged prior to being deposited onto the substrate. Due to the substrate, and any layers already deposited thereon, being heated, the deposited material may adhere to the heated substrate or layer to form the desired layer disposed thereon.

In some embodiments, it may be desirable to deposit two or more material layers on a substrate. In such an embodiment, first particles may be applied to the substrate including at least one selected from the group of an electrochemical material, an ionically conductive material, an electrically conductive material, and a separator material. In some cases, these first particles may form a first electrode layer, such as an anode or cathode, on the substrate when applied. For example, the first electrode layer may include both electrochemical materials and a solid electrolyte. Second particles including at least one selected from the group of an electrochemical material, an ionically conductive material, an electrically conductive material, and a separator material different from the first particles may then be applied to the substrate on top of the first layer. In an embodiment where the first layer is an electrode layer, the second particles may be made from a material to form a separator layer and/or solid electrolyte layer disposed on top of the electrode layer. In some applications, a second electrode layer may then be deposited on the separator and/or solid electrolyte layer. For example, in one embodiment of a battery electrode manufacturing process, an anode layer, a solid state electrode and/or separator layer, and a cathode layer may be sequentially deposited onto a substrate using the methods and systems disclosed herein. Of course, the systems and methods described herein may be used to form any suitable number of material layers for any desired application as the present disclosure is not so limited.

It should be understood that the disclosed deposition system may include any suitable heater that may be used to heat a substrate during a material deposition process. For example, in one embodiment, a heater may be configured to resistively heat a substrate by passing a current through the substrate to generate internal heat in the substrate. Alternatively, heaters employed with spray deposition systems may transfer heat to the substrate, and associated deposited layer, in any appropriate manner including convective heat transfer, conductive heat transfer, and/or radiative heat transfer. For example, appropriate types of heaters may include, but are not limited to: a radiative heater; a heated surface such as a smooth heated glass or roller surface the substrate passes over; a heated oven or other environment the substrate passes through; hot air blowers; or any other appropriate device capable of transferring heat to the substrate. Of course, combinations of the above heaters are also contemplated as the present disclosure is not limited to any particular arrangement of heaters for heating a substrate.

In some embodiments, a system for forming a particle layer on a substrate includes one or more pairs of calendering rollers configured to compress, and optionally heat, a substrate and one or more material layers deposited on the substrate to densify the one or more material layers as they pass between opposing calendering rollers. In some embodiments, the calendering rollers may be disposed at a location following each sprayer along a manufacturing line, so that deposited material may be calendered to densify and/or fully bond the material to the substrate prior to depositing additional material layers and/or completing a desired layer formation process. Alternatively, there may be a pair of calendering rollers included in a system disposed at a location following multiple sprayers along a direction in which the substrate moves through the system. The sprayers may deposit separate material layers sequentially. Thus, such an arrangement may allow multiple deposited material layers to be calendered simultaneously by a single pair of calendering rollers. Accordingly, it should be understood that any appropriate number of calendering rollers may be included in the system at any number of appropriate locations as the disclosure is not limited to any particular arrangement.

According to some embodiments, a particle layer manufacturing process may be a semi-continuous or continuous process. In a semi-continuous process, a substrate may be intermittently fed through a system by a conveyer constructed to move a substrate through the system relative to the various sprayers, heaters, calendering rollers, and/or other components. For example, a conveyer may correspond to a pair of rollers where a substrate may be unwound from a first roller and wound onto a second roller to advance a preselected length of the substrate through the system between the rollers. At least one sprayer as well as at least a first and second mask may be disposed between the first roller and the second roller along a path of the substrate extending between the rollers. The first mask and second mask may be moveable to selectively cover a first region and second region of the substrate, respectively, while the substrate remains stationary. Next, the at least one sprayer may deposit a material at a target region of the substrate between the first and second masked regions. The first and second mask may then be moved out of contact with the substrate to release or otherwise uncover the first region and second region, whereupon the first roller and second roller may advance the substrate. This semi-continuous process may be repeated multiple times for the whole substrate, as the material is sequentially advanced, the masks cover different regions of the substrate, and material is deposited onto multiple target regions along a length of the substrate while maintaining regions of the substrate between adjacent target regions bare of the deposited material. In another embodiment, the process may be continuous, where the first mask and second mask may move in sync with the substrate as the substrate is continuously moved through a system as may occur as a substrate is continuously unwound from a first roller and wound onto a second roller. Additional masks may cover other regions of the substrate. Further, at least one stationary or mobile sprayer may deposit a material onto the substrate as the substrate passes through the system. Accordingly, such an arrangement may allow material to be continuously deposited onto the substrate. Of course, systems according to exemplary embodiments described herein may be used in a continuous, semi-continuous, or non-continuous manner, as the present disclosure is not so limited.

A system may include any appropriate type of conveyor for transporting a substrate through a system relative to one or more sprayers used to deposit materials onto the substrate. For example, a conveyer may move a substrate from an upstream location towards a downstream location through the system. Appropriate types of conveyors may include, but are not limited to: opposing rollers the substrate may extend between such that the substrate may be unwound from one and wound onto the other roller; movable platforms and/or conveyor belts the substrate is disposed on; and/or any other appropriate device or construction capable of moving a substrate through a system for depositing one or more layers there on as disclosed herein.

As used herein, a mask refers to any solid body suitable to substantially cover a desired portion of a substrate to inhibit particles being sprayed, or otherwise deposited, onto the substrate in a region covered by the mask. In some embodiments, a mask may be configured as a clamp, or other selectively moveable component, which may be moved into contact with a desired portion of the substrate. Thus, in some embodiments a mask may clamp the substrate, to further inhibit sprayed particles from covering the masked portion of the substrate. In other embodiments, the mask may be configured as a shield disposed between a sprayer and a substrate to effectively deflect particles from a region or portion of the substrate without physically contacting the substrate. Accordingly, a mask may be any suitable structure which inhibits material being deposited onto a substrate such that a portion of the substrate underlying the mask remains bare after a material layer is deposited onto the substrate. Again, while any appropriate structure capable of masking a substrate may be used, possible constructions may include, but are not limited to, a casing, covering, wrapper, envelope, shield, sheath, and/or any other appropriate structure. Further, these masks may be static and/or may be moveable into and out of contact with a substrate depending on the embodiment.

Depending on the particular application, the particles sprayed onto a substrate noted above may correspond to any appropriate material for use in forming one or more layers within an electrochemical cell including, but not limited to an anode, cathode, separator, and/or solid electrolyte layers. These materials may include an ionically conductive material, an electrochemical material, a separator material, an electrically conductive material, a binder, combinations of the foregoing, and/or any other appropriate material. Further, depending on the particular material, the material may be deposited by itself, mixed with a binder, and/or the material may be pre-coated with a binder. Thus, embodiments in which particles comprising a single material are sprayed onto a substrate as well embodiments in which particles including a combination of different materials are co-sprayed and/or coaerosolized with one another to form a deposited layer on a substrate are both contemplated as the disclosure is not so limited.

As noted above, in certain embodiments, the described materials and processes may be used to form one or more layers to be used in the manufacture of an electrochemical cell. These layers may include one or more of an anode, cathode, separator layer, solid state electrolyte layer, and/or any other appropriate layer present in a desired electrochemical cell. Examples of electrochemical cells may include, but are not limited to, batteries (primary and secondary), super capacitors, fuel cells, and/or any other appropriate electrochemical cell. However, while the particular materials and processes described herein are primarily directed to electrochemical cells, and more specifically Li-ion based chemistries, it should be understood that the currently described methods and devices may be used to manufacture and deposit any appropriate type of particle material that is mixed with a binder, coated with a binder, and/or has appropriate material properties to adhere to a desired substrate including different types of electrochemical cell chemistries as the disclosure is not limited to any particular application and/or chemistry.

To facilitate the manufacture of the above noted layers of an electrochemical cell, it may be desirable to sequentially deposit different types of materials in separate layers that are disposed one on top of the other using the methods described herein. For example, in one embodiment, first particles including a first electrochemical material, such as an electrochemical material, may be deposited onto an electrode to form a first active layer corresponding to an anode or cathode of an electrochemical cell. A second material, such as a first ionically conductive material or separator material, may then be deposited onto the first active layer to form a separator or solid state electrolyte layer on the electrode. A third material, such as a second electrochemical material, may then be deposited onto the second layer to form a second active layer corresponding to the other of the anode and cathode of the electrochemical cell. Alternatively, the other active layer may be deposited onto a separate electrode and assembled with the other layers through either a stacking or winding process. In some embodiments, a high pressure calendering process may be used to help densify the various layers either between depositions of the different layers and/or simultaneously after each of the layers has been deposited onto the substrate.

Possible electrochemical materials that may be used with the disclosed methods and systems may include, but are not limited to, lithium cobalt oxide (LCO), lithium nickel manganese cobalt oxide (NMC), lithium manganese cobalt oxide (LMCO), lithium iron phosphate (LFP), lithium manganese iron phosphate (LMFP), lithium nickel cobalt aluminum oxide (NCA), lithium titanate (LTO), silicon, sulfur and/or combinations thereof. While particular types of electrochemical materials have been listed above it should be understood that any appropriate electrochemical material may be used as the disclosure is not limited to only these materials.

Possible electrically conductive materials that may be used with the disclosed methods and systems may include, but are not limited to, carbon (e.g., graphite) and/or any other appropriate electrically conductive material appropriate for use in a particular electrochemical cell. It should be noted that carbon may also be used as an electrochemical material (e.g., a lithium ion anode) in certain embodiments.

For the purposes of this disclosure, ionically conductive materials may include materials that facilitate the transport of ions both through the bulk of the material and/or the transport of ions along an interface between the material and a layer of binder material disposed on a particle surface. For example, $Li_2O$ particles may transport Li ions through the bulk of the particles. In contrast, $TiO_2$ when combined with polyethylene oxide (PEO) may exhibit enhanced transport of Li ions when compared to either of these materials along which, without wishing to be bound by theory, may be due to an enhanced transport of Li ions along the interface between the $TiO_2$ particles and PEO binder. Of course, it is contemplated that certain particle binder combinations may exhibit either one or both of these effects. However, in either case, these materials are still considered to be ionically conducting or ionically conductive materials for the purposes of this application.

In view of the above, possible ionically conducting materials that may be used with the disclosed methods and systems may include one or more ionically conducting ceramics such as metal oxides, and/or metal oxides that facilitate the transport of ions along an interface with a binder, such as $Al_2O_3$, $SiO_2$, $TiO_2$, MgO, ZnO, $ZrO_2$, CuO, CdO, and $Li_2O$. Alternatively, and/or in combination with the noted metal oxides, the ionically conducting material may be an ionically conducting glasses such as one or more of $Li_2S$, $P_2S_5$, and $xLi_2S-(1-x)P_2S_5$. While particular types of ionically conductive materials have been listed above it should be understood that any appropriate ionically conductive material may be used as the disclosure is not limited to only these materials.

In some embodiments, the above noted ionically conducting materials may be used to form a solid state electrolyte layer. Alternatively, these materials may be mixed with one or more other materials such as an electrochemical material, a separator material, an electrically conductive material, and/or any other appropriate material to increase an ionic conductivity of that layer.

As noted above, in some embodiments, a separator layer may be formed on a previously deposited material layer, such as an electrode of an electrochemical cell. In such an embodiment, the separator may be formed of any suitable number of materials, including, but not limited to, polyethelene, prolpropylene, or other polymers. In other embodiments, the separator layer may be formed of ceramic particles mixed with a polymer. In such an embodiment, the ceramic particles may be combined with the polymer during a spray deposition process. For example, pre-mixing polymer particles with ceramic particles, or gas-phase mixing and co-depositing polymer particles with ceramic particles may be used. Alternatively, the ceramic particles may be pre-coated with the polymer prior to spray deposition.

Appropriate types of binders that may be used with the disclosed methods and systems may include, but are not limited to, any appropriate thermoplastic polymer. It should be noted that the deposition of material layers without the use of a solvent using the methods and systems described herein may enable the use of binder materials that may improve properties of a resulting electrochemical cell, but that are not typically used in solvent based deposition processes. For example, binders that are more ionically and/or electronically conductive than typical binders, but that are not easily soluble in typical solvents, may be used to form the pre-coated particles. Accordingly, appropriate polymers may include, but are not limited to polyvinylidene fluoride (PVDF), polytetrafluoroethylene (PTFE), styrene-butadiene (SBR), polyethylene oxide (PEO), polyacetylene, polyphenylene, polypyrrole, polythiophene, polyaniline, polyphenylene sulfide, and/or combinations of the above.

Depending on the particular binder being used, it may be desirable to increase the ionic conductivity of a binder material being used. Accordingly, in some embodiments an ionically conductive salt may be dissolved in a binder to improve the ionic conductivity. In one such embodiment, a lithium salt may be dissolved in the thermoplastic material of a binder. In such an embodiment, the thermoplastic binder materials may correspond to any of the polymers noted herein and may include a lithium salt dissolved therein. Appropriate lithium salts include, but are not limited to, $LiClO_4$, $LiBF_4$, $LiPF_6$, $LiAsF_6$, LiTf, LiTFSI, LiBETI, LiCTFSI, LiBOB, LiTDI, LiPDI, LiDCTA, and $LiB(CN)_4$. In one specific embodiment, a lithium salt may be dissolved in PEO to form PEO-LiX. Of course, other types of salts as well as the inclusion of non-lithium based salts may be used depending on the particular chemistry of an electrochemical cell the binder is being used with.

As noted above, in some embodiments, a binder may be applied during spray deposition of a material layer either as a separate powder co-sprayed with another material and/or the binder may be pre-coated onto particles of a desired material. In either case, any appropriate amount of binder may be included in a material layer to provide a desired conductivity in combination with the binder material properties for binding a material layer to a substrate or an underlying material layer. Accordingly, a material layer including a binder may include a portion of binder that is greater than or equal to 1%, 10%, 20%, or any other appropriate portion of a binder. Correspondingly, the material layer may include a binder in a portion that is less than or equal to 40%, 30%, 20%, 10%, or any other appropriate portion. Combinations of the above ranges are contemplated including, for example, a material layer with a portion of binder between or equal to 1% and 40%, 1% and 10%, or any other appropriate portion of binder both greater than or less than that noted above as the disclosure is not so limited.

Particles used with the spray deposition systems and methods described herein may have any appropriate size including micro and/or nanoparticles. For example, a particle may have a maximum transverse dimension (e.g. maximum diameter) that is greater than or equal to 10 nm, 50 nm, 100 nm, 250 nm, 1 µm, 100 µm, or any other appropriate size. Similarly, the particles may have a maximum transverse dimension that is less than or equal to 300 µm, 250 µm, 100 µm, 1 µm, 250 nm, or any other appropriate size. Combinations of the above ranges are contemplated including, for example, particles with a maximum transverse dimension between or equal to 10 nm and 300 µm. Of course, particles with dimensions both greater than and less than those noted above are also contemplated as the disclosure is not so limited.

As used herein, the terms coat, coating, pre-coated, as well as other similar terms, may refer generally to a layer of material applied to an exterior surface of a particle. Additionally, this coating of material may either fully coat the individual particles and/or the coating may be applied to at least a portion of the particles such that they are not fully coated or encapsulated. Additionally, a coating or encapsulation may either be applied to a single particle, or multiple particles may be coated or encapsulated within a single outer shell or coating. For example, multiple particles, such as two or three particles, may be encapsulated or coated such that they form a single larger particle. Therefore, it should be understood that a plurality of particles including coated particles may correspond to embodiments where each particle is coated individually, instances where several particles are coated such that they form a larger combined particle, particles that are only partially encapsulated, particles that are fully encapsulated, as well as combinations of these types of particles.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a side schematic representation of one embodiment of a spray deposition system 100 for forming a layer on a substrate. In particular, the spray deposition of FIG. 1 may be configured to form a battery electrode including an anode or cathode material. As shown in FIG. 1, the spray deposition system includes a conveyor for moving a substrate 101, such as a metal foil, through the system. For example, in the depicted embodiment, a conveyor may include a first roller 102A and a second roller 102B between which the substrate is suspended. The first and second rollers are configured to move the substrate from one roller to the other roller (e.g., from the first roller to the second roller or from the second roller to the first roller). In either case, the substrate is unwound from one roller and wound onto the other roller so that material may be deposited in a continuous or semi-continuous process if desired. However, embodiments in which a substrate is moved through a spray deposition system without the use of rollers are also contemplated as the disclosure is not so limited. The spray deposition system also includes at least one sprayer 104 directed towards the substrate for depositing a material thereon. For example, in embodiments where it is desirable to deposit material on both sides of a substrate simultaneously, two sprayers 104 may be disposed on opposite sides of the substrate for depositing material onto two surfaces of the substrate in a single process. In either case, the sprayers may be arranged as a spray gun or any other appropriate device capable of aerosolizing, and in some embodiments appropriately charging, a powder that is then sprayed onto a surface of the substrate for a powder coating process.

In the above embodiment, the sprayers are each connected to a reservoir 106 which contains a powdered material for deposition on the substrate. In some embodiments, the reservoir may correspond to a fluidized bed, a venture atomizer, a Wright dust feeder, or other appropriate device that is capable of aerosolizing and/or otherwise transporting the dry powder to the sprayer. As will be discussed further with reference to FIG. 2, the sprayer may charge the particles ejected from the spray gun which may facilitate the particles evenly distributing across and adhering to a region of the substrate targeted by the sprayer.

As discussed previously, the powdered material may include any appropriate material for use in forming one or more layers within an electrochemical cell including, but not limited to anode, cathode, separator, and/or solid electrolyte layers. These materials may include an ionically conductive material, an electrochemical material, a separator material, an electrically conductive material, a binder, combinations of the foregoing, and/or any other appropriate material. Further, depending on the particular material, the material may be deposited by itself, mixed with a binder, and/or the material may be pre-coated with a binder.

As shown in the embodiment of FIG. 1, the spray deposition system also includes first masks 108A and second masks 108B which are coupled to first mask actuators 110A and second mask actuators 110B, respectively. According to the embodiment of FIG. 1, the first masks and second masks are configured as clamps which close on upper and lower surfaces of the substrate 101 to selectively grasp and cover regions of the substrate to keep them bare during a spray deposition process. However, embodiments, in which first and second masks are only applied to a single side of a substrate are also contemplated. The position of the first and second masks are controlled by the actuators such that the masks are moveable between a first position in which they are in contact with the substrate and a second position in which they are not in contact with the substrate. For example, the first and second mask actuators may move the first and second masks closer to, or further away, from the substrate. The first mask actuators and second mask actuators may be electromechanical actuators (e.g., linear actuators, servomotors, DC motors, brushless motors, etc.), pneumatic actuators, hydraulic actuators, and/or any other appropriate actuator suitable for moving the masks relative to a substrate. The first and second mask actuators are controlled by a first mask actuator controller 112A and a second mask actuator controller 112B, which may control a supply of electricity, air, and/or hydraulic fluid employed by the mask actuators to move the masks into or out of contact with the substrate. Of course, in other embodiments, a spray deposition system may employ a single mask actuator controller or any other suitable number of mask actuator controllers which control any suitable number of mask actuators, as the present disclosure is not so limited. Further, these controllers may include at least one hardware processor and at least one associated non-transitory computer-readable storage medium storing processor executable instructions that, when executed by the at least one hardware processor control the actuators and other components of the system to perform the methods described herein.

According to the embodiment of FIG. 1, the first and second masks 108A, 108B are configured to pass a current supplied by an associated power source between the first and second masks through the substrate 101 to resistively heat the substrate between the masks in a region the one or more sprayers 104 are directed towards. That is, the passage of current though the substrate in combination with the internal electrical resistance of the substrate generates internal heat in the substrate in the region of the substrate between the first and second masks. For example, the first and second masks may be configured to function as electrodes which make electrical contact with the substrate when the masks are in a contact with the substrate to mask a bare region of the substrate from sprayed particles. Depending on the particular embodiment, the first and second masks may be composed of any suitable electrically conductive material, or may include one or more electrically conductive portions, so that current may be passed through the substrate via the first mask and second mask. It should be noted that current may be passed in any suitable direction though the substrate. That is, in some embodiments, the electrical current may be passed from the first masks 108A to the second masks 108B, and in other embodiments, the electrical current may be passed from the second masks to the first masks as the disclosure is not limited in this fashion. Further, the conductive portions of the first masks and second masks in contact with the substrate may be suitably sized so as to avoid hot spots being formed via current concentration on the substrate and to promote even resistive heating. For example, in one embodiments, an electrically conductive portion of the first mask and second mask may span an entire width of the substrate to mitigate potential hot spot formation, though smaller electrical contact sizes are also contemplated. In some embodiments, the mask actuator controllers 112A, 112B may also selectively pass electrical current to the first masks 108A and second masks 108B so the number of disparate controllers may be reduced. Of course, the electrical current may be passed through the masks using any suitable number of independent or combined controllers, as the present disclosure is not so limited.

While the embodiment FIG. 1 uses first and second masks as electrodes to pass a current through the substrate, it should be noted that any suitable arrangement of electrodes may be employed to pass current through the substrate. For example, conductive rollers or conductive brushes at different locations may pass the current through the substrate. For example, in some embodiments, a conductive roller or brush may pass current through the substrate and one or more layers of material deposited by the sprayers. That is, current may be passed into or out of the underlying substrate via conductive rollers or brushes in electrical contact with a material layer disposed on the substrate. In one such embodiment, calendering rollers may be used to pass current into or extract current from the substrate through the material layer. In this embodiment, another roller or brush may be used to pass current into or extract current directly from the substrate at a location of the substrate which has yet to undergo spray deposition. Of course, any suitable resistive heating arrangement may be employed, as the present disclosure is not so limited.

As shown in FIG. 1, the spray deposition system 100 may also include a pair of calendering rollers 114 which may be used to densify a deposited material layer. The calendering rollers may be heated and apply a sufficiently high pressure to the substrate and any material layers which may be disposed on the substrate to densify the layer to a desired thickness and bond the layer to the substrate as the substrate passes between the pair of calendering rollers. Accordingly, after a deposited material layer is passed through the calendering rollers, the material layer may have a uniform density and thickness, in addition to being denser than the non-calendered layer. In some embodiments, the calendering rollers may be used to densify multiple material layers simultaneously.

Figure 2:
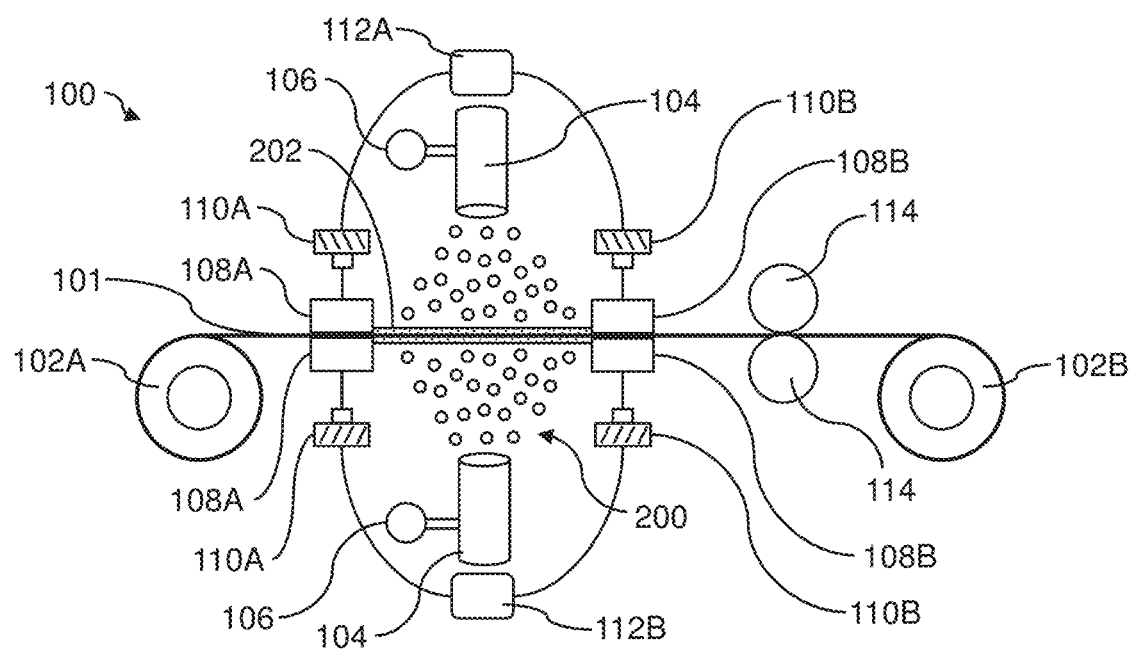
FIG. 2 is a side schematic representation of the spray deposition system of FIG. 1 during a material deposition process.

FIG. 2 is a side schematic representation of the spray deposition system 100 of FIG. 1 during a material deposition process. As shown in FIG. 2, the first masks 108A and the second masks 108B have been moved into contact with the substrate 101 to mask off (i.e., cover) bare regions of the substrate on both sides of the substrate so that the deposited material does not accumulate on the bare masked regions. Though again, embodiments in which a material layer is deposited on a single side of the substrate and a single pair of masks are used are also contemplated. While the masks are in the clamped position, the first and second rollers 102A and 102B which control movement of the substrate 101 extending there between are held stationary. As discussed previously, the first masks and second masks may be configured as electrodes, and are in electrical communication with one another though the substrate in the clamped state shown in FIG. 2. Once appropriately positioned, current is passed through the first masks and second masks to resistively heat the substrate between the first masks and the second masks. As shown in FIG. 2, the two sprayers 104 located on opposing sides of a target region of the substrate between the masks charge and aerosolize first particles 200 and then spray the first particles towards the opposing exposed surfaces of the substrate. The first particles are fed to the sprayers from reservoirs 106. The spray deposition process may be continued until a suitable amount of the first particles have been deposited on the substrate between the first and second masks. The thickness of a deposited layer may be controlled by the deposition rate of material emitted from the spray guns, time of deposition, and/or other appropriate control parameters. In some embodiments, the electrical potential applied to the substrate via the first masks and second masks may be selected so that the charged particles are attracted towards the substrate. For example, the charged particles may be charged with a large negative or positive potential and the potential applied by the first and second masks may be lower and/or opposite that of the charged particles so that the charged particles are attracted to and stick to the substrate when sprayed. In one embodiment, one of the first masks and second masks may be grounded, so that at least a portion of the substrate adjacent the grounded mask is also grounded.

As mentioned previously above, depending on what type of material is sprayed on to a substrate to form a deposited layer, different types of structures may be formed using the described process. For example, the disclosed system may be used to deposited electrode layers, separator layers, solid state electrolyte layers, electrically conductive layers, and/or any other appropriate material layer. Accordingly, while several possible embodiments are described above, it should be understood that the presently disclosed materials and processes should not be limited to just these types of applications and structures.

It should be noted that while a reel-to-reel spray deposition system 100 is shown in FIGS. 1-2, alternative spray deposition systems may be employed which do not include the first roller 102A and the second roller 102B. In one such an embodiment, the first masks 108A and second masks 108B may be configured to hold a substrate stationary during spray deposition by the sprayer 104. That is, the first masks and second masks may be used to selectively grasp an individual substrate that is positioned between and held in place by the masks, so that a spray deposition process may be performed non-continuously.

Figure 3:
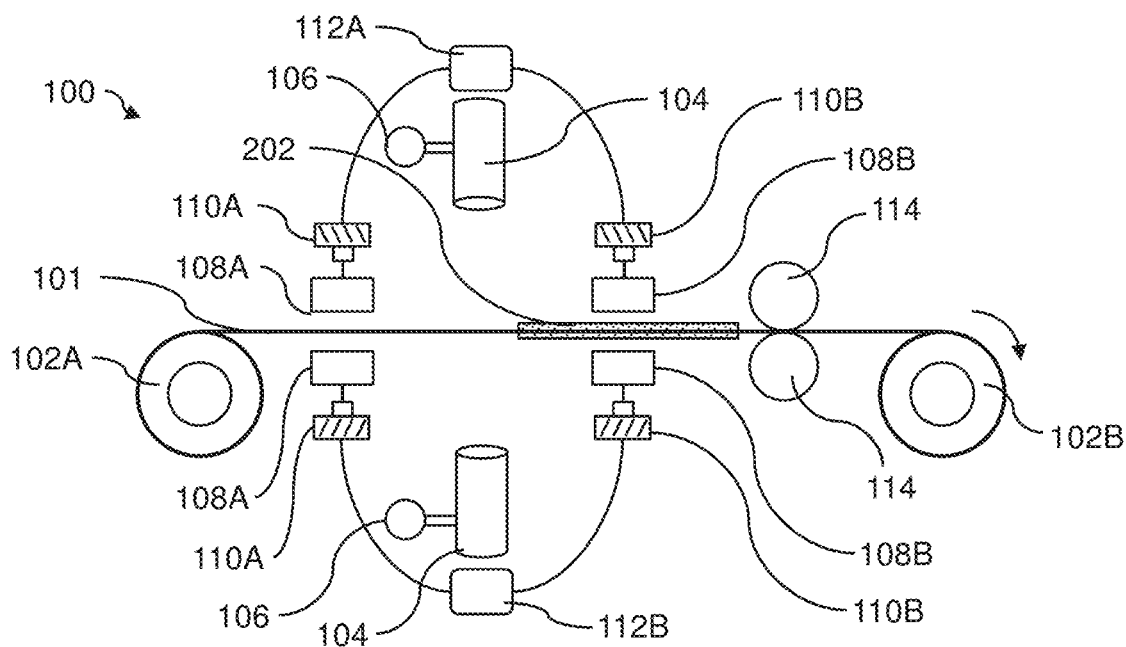
FIG. 3 is a side schematic representation of the spray deposition system of FIG. 1 during a material deposition process.

FIG. 3 is a side schematic representation of the spray deposition system 100 of FIG. 1 during a material deposition process after a first material layer 202 has been deposited on the substrate 101. As shown in FIG. 3, a material layer of a desirable thickness has been deposited on the substrate from the sprayers 104. The first masks 108A and second masks 108A have been moved to a released position such that they are distanced from a surface of the substrate so that the substrate may be moved laterally through the system between the masks. That is, in the embodiment of FIG. 3, the first mask actuators 110A and the second mask actuators 110B have moved the first masks and second masks away from and out of contact with the substrate, respectively. As denoted by the arrow adjacent the second roller 102B, when the first masks and second masks are out of contact with the substrate, the first roller 102A and second roller 102B may rotate, or another appropriate conveyor construction may be operated, to move the substrate through the system. The masks may be appropriately distanced from the substrate in the open configuration to avoid contacting the deposited layers as the substrate is moved. In the depicted embodiment, the first roller and second roller rotate clockwise relative to the page to unwind the substrate from the first roller and wind the substrate on the second roller though the disclosure is not limited to the direction and/or method of movement of a substrate through a system. Accordingly, the first and second rollers move the deposited material layer toward the calendering rollers 114 to calender the deposited material layer.

Figure 4:
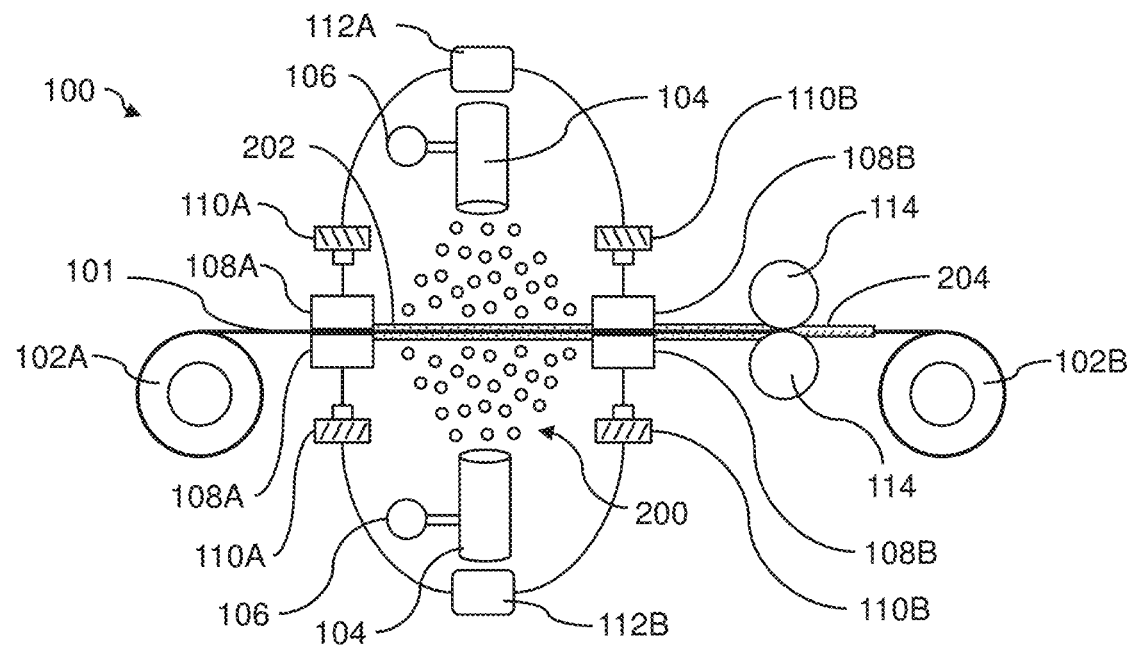
FIG. 4 is a side schematic representation of the spray deposition system of FIG. 1 during a material deposition process.

FIG. 4 is a side schematic representation of the spray deposition system 100 of FIG. 1 during a material deposition process following the state shown in FIG. 3. As shown in FIG. 4, the first deposited material layer is fed through the calendering rollers 114 so that a calendered material layer 204 is formed as the first material is densified. In some embodiments, the calendering rollers may be heated to facilitate the densification and bonding of the deposited material layer to the substrate. As shown in FIG. 4, when the first deposited material layer is moved past the second masks 108B, the first and second rollers 102A, 102B may stop the substrate so that another first material layer may be deposited on the substrate. That is, when the bare region which was first covered by the first masks 108A is aligned with the second masks 108B, the substrate may be stopped and the first and second masks moved to grasp the substrate. The first mask actuators 110A and second mask actuators 110B may move the first masks and second masks towards and into contact with the substrate so that bare regions of the substrate are covered. As shown in FIG. 4, the sprayers 104 may deposit charged first particles 200 from the reservoirs 106 onto both sides of the substrate while the first and second masks shield bare regions from particle deposition and pass a current through the substrate to resistively heat the substrate. Accordingly, the spray deposition system of FIGS. 1-4 sequentially deposits material layers onto a substrate which are separated by bare regions shielded by the masks. As noted previously, the bare regions may help to ensure consistent resistive heating of the substrate in a target region of the sprayers, while also providing regions of bare substrate which facilitate cutting of the substrate and/or the attachment of electrical leads to the substrate during a later formation step.

It should be understood that the calendering rollers 114 depicted in the above embodiment may be disposed at any appropriate position within the system along a length of the substrate extending through the system. For example, the calendering rollers may be positioned as depicted in the figures, or they may be positioned at a location such that when a new target region of the substrate is positioned between the masks, the calendering rollers may be located above a bare region of the substrate to avoid applying heat and/or pressure to a portion of a deposited material layer for an extending period of time. Accordingly, the calendering rollers are not limited to only the depicted locations.

Figure 5:
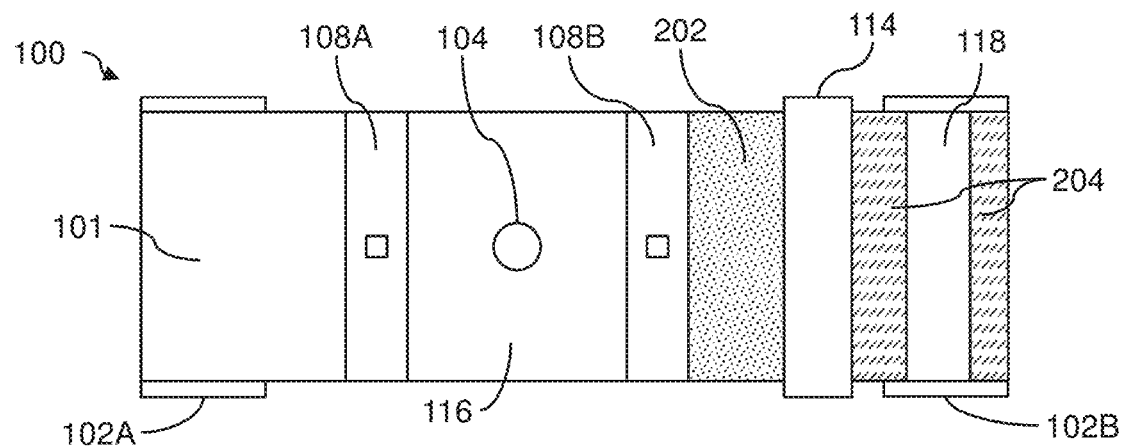
FIG. 5 is a top schematic representation of the spray deposition system of FIG. 1 during a material deposition process.

FIG. 5 is a top schematic representation of the spray deposition system 100 of FIG. 1 during a material deposition process. The state shown in FIG. 5 corresponds to a state following that shown in FIG. 4, where multiple first material layers 202 have been deposited and moved through calendering rollers 114 to form multiple calendered first material layers 204. Each of the calendered first material layers is separated from an adjacent calendered first material layer by a bare region 118 of the substrate corresponding to the regions covered by the first mask 108A and the second mask 108B. A next target region 116 of the substrate is aligned between the first mask 108A and the second mask 108B for material deposition, with a previously deposited first material layer having been partially and/or fully calendered depending on the location of the calendering rollers along a length of the substrate. Further, in this particular configuration the portion of the substrate previously shielded by the first mask is now aligned with and shielded by the second mask.

Figure 6:
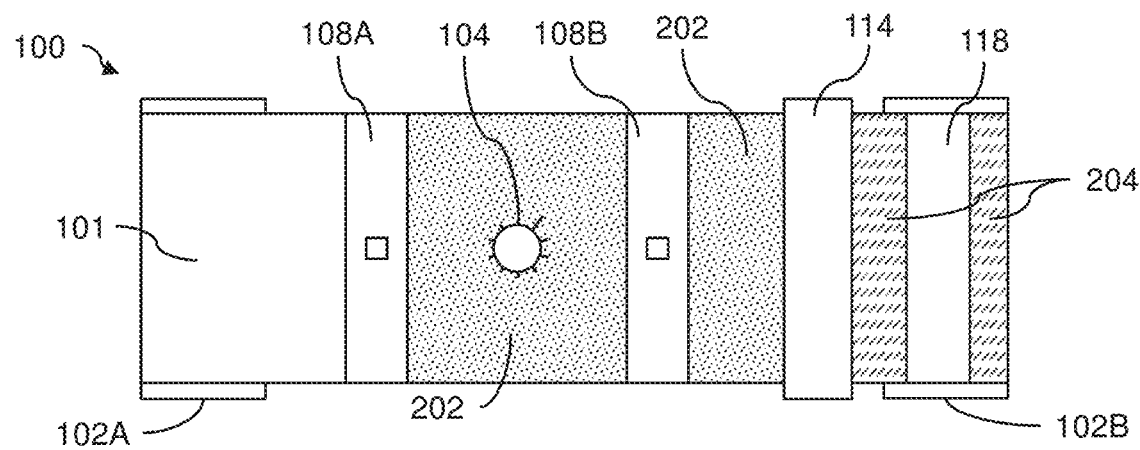
FIG. 6 is a top schematic representation of the spray deposition system of FIG. 1 during a material deposition process.

FIG. 6 is a top schematic representation of the spray deposition system 100 of FIG. 1 following the state shown in FIG. 5. As shown in FIG. 6, the sprayer 104 sprays first particles towards the target region of the substrate to form another first material layer 202 while bare regions adjacent the target region are covered by the first mask 108A and second mask 108B. The first mask and second masks may be in contact with the underlying substrate during the spraying process so that they effectively cover the underlying regions of the substrate and inhibit sprayed particles from being deposited on the bare regions. As shown in FIG. 6, the first mask and second mask cover an entire width of the substrate, though embodiments in which the masks extend partially across a width of the substrate and/or exhibit different arrangements and/or shapes are also contemplated. In either case, once the masks are placed in contact with the substrate, current may be passed between the first and second masks through the substrate to resistively heat the target region of the substrate while the first particles are deposited from the sprayer 104.

Figure 7:
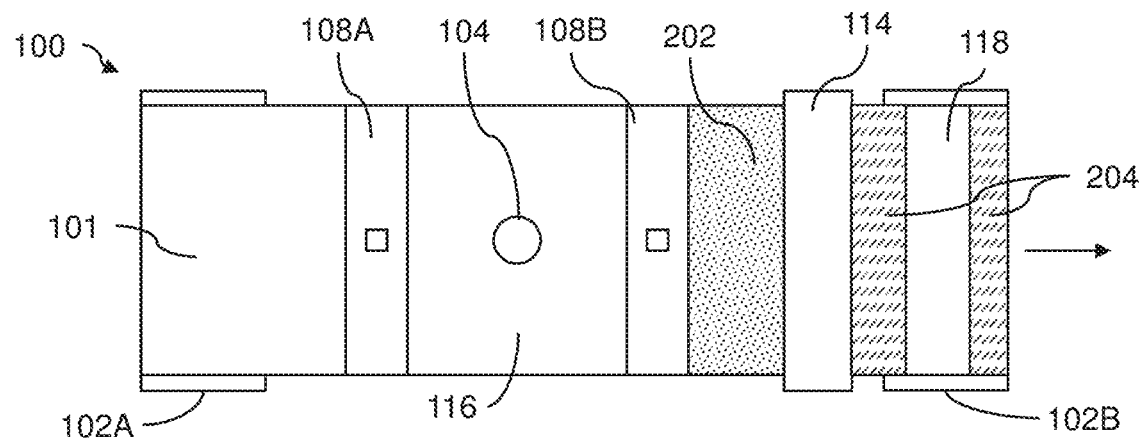
FIG. 7 is a top schematic representation of the spray deposition system of FIG. 1 during a material deposition process.

FIG. 7 shows the continuation of the process from FIG. 6. From the state shown in FIG. 6 where an additional first material layer 202 is deposited in a target region of the substrate, the first mask 108A and second mask 108B are moved out of contact with the substrate by an appropriate distance so as to not interfere with the substrate or the deposited material layer when the substrate is moved. The first roller 102A and second roller 102B, or other appropriate substrate handling system, are then operated to move the substrate toward the calendering rollers 114. Once the next target region 116 is aligned between the first and second masks, the first and second rollers are stopped. From this state, the first and second mask may be moved back into contact with the substrate at a bare region so that an additional material layer may be deposited. This process may be repeated as many times as desired to create a series of sequentially arranged deposited material layers and bare regions along a length of a substrate.

Figure 8:
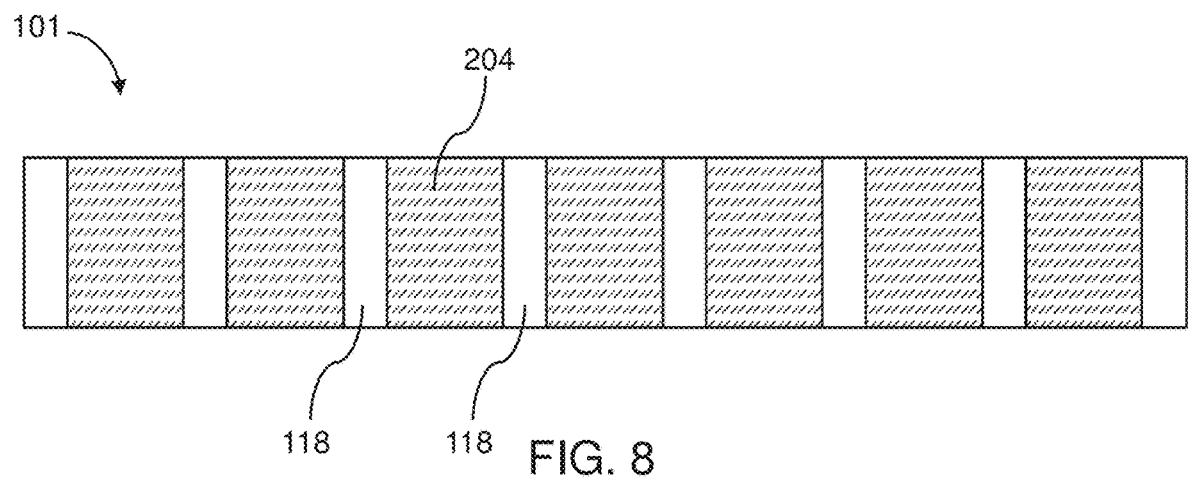
FIG. 8 is a top schematic representation of a material produced by the spray deposition system of FIG. 1.
Figure 9:
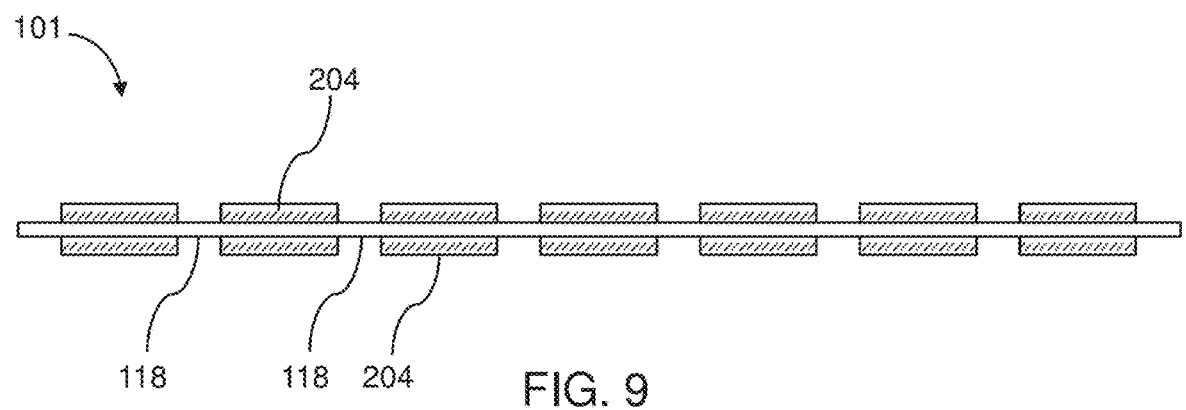
FIG. 9 is a side schematic representation of the material of FIG. 8.

FIGS. 8-9 are a top and side schematic representation, respectively, of a material produced by the spray deposition system of FIGS. 1-7. As noted previously, the end material produced by the spray deposition system of FIGS. 1-7 may be a substrate 101 having alternating regions of deposited material layers 204 and bare regions 118 located along a length of a substrate. Further, in some embodiments, the material layers are calendered material layers, and each of the deposited calendered material layers may be at least partially separated from the other calendered material layers by a bare region. Accordingly, segments of the substrate may be easily separated (i.e., cut) along the bare regions, producing disparate electrodes which may have electrical leads welded, soldered, or otherwise coupled to the substrate within the bare regions during a later formation process. Such a material may greatly simplify the manufacturing of batteries or other electrochemical cells, as it eliminates an additional process step of removing material from the substrate prior to calendering and/or attachment of the electrical leads.

Figure 10:
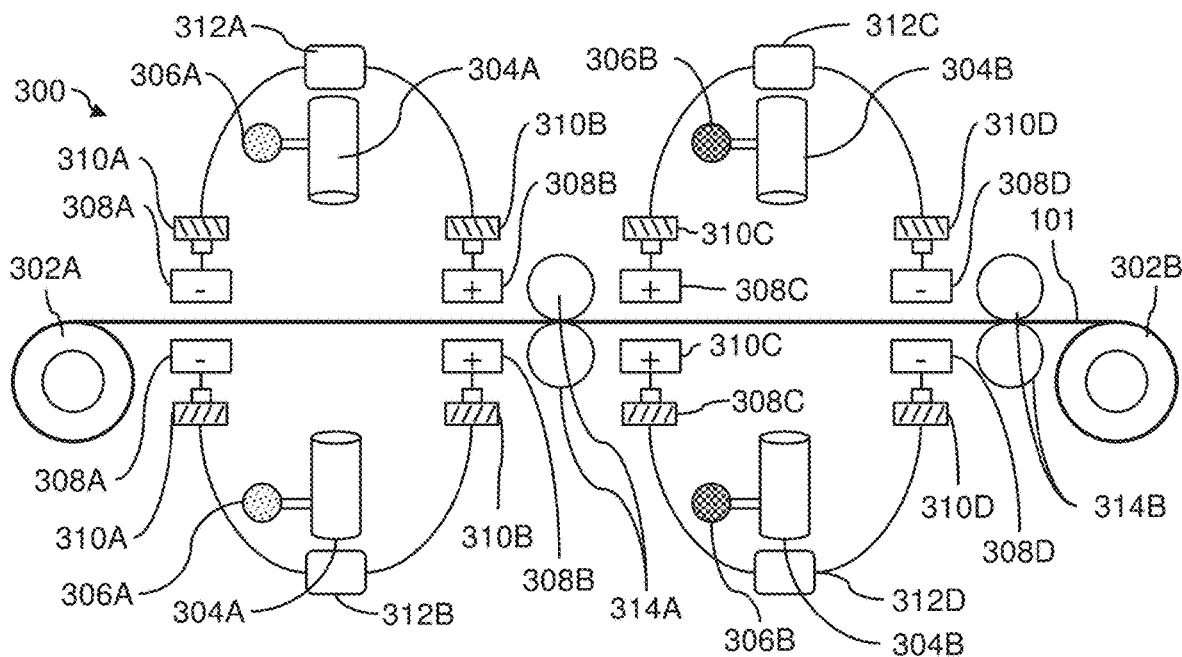
FIG. 10 is a side schematic representation of another embodiment of a spray deposition system.

FIGS. 10-13 are side schematic representations of another embodiment of a spray deposition system 300 where multiple materials are sequentially deposited onto a substrate. Similar to the embodiment of FIGS. 1-7, the deposition system shown in FIG. 10 may include a first roller 302A and a second roller 302B which allows a substrate 101 to be continuously unwound from one roller and wound onto the other roller. As shown in FIG. 10, the spray deposition system includes two distinct stations where different material layers are deposited in sequence. The first station of the spray deposition system includes first sprayers 304A coupled to first reservoirs 306A which deposit first particles on the substrate. First masks 308A and second masks 308B also form part of the first station, and are configured to selectively contact the substrate to cover bare regions and define a first target region of the substrate there between for material deposition. Like the embodiment of FIGS. 1-7, the first masks and second masks are controlled by first mask actuators 310A and second mask actuators 310B, respectively. The first mask actuators and second mask actuators are in turn controlled by a first mask actuator controller 312A and a second mask actuator controller 312B. Finally, the first station may include a first set of calendering rollers 314A downstream from the first work station which may be configured to densify a first material layer once deposited by the first sprayers 304A. The second station of the spray deposition system includes components similar to those of the first station. The second station includes second sprayers 304B coupled to second reservoirs 306B. The second station also includes third masks 308C and fourth masks 308D which define a second target region there between for depositing material onto the substrate. The third and fourth masks may be coupled to third mask actuators 310C and fourth mask actuators, respectively, which in turn are controlled by a third mask actuator controller 312C and a fourth mask actuator controller 312D. Finally, the second station may also include second calendering rollers 314 downstream from the second station which are configured to densify a second material layer deposited by the second sprayers. Thus, the spray deposition system of FIGS. 10-13 is configured to sequentially deposit and calender two separate material layers on a substrate. Of course while two stations for depositing two layers are described above, it should be understood that a system may include any number of deposition stations for sequentially depositing any number of different material layers as the disclosure is not limited to the number of deposition stations for included in a system.

In the state shown in FIG. 10, the spray deposition system is in a starting state where no material layers have been deposited. Such a state may exist when a roll of the substrate 101 is first connected to the first roller 302A and the second roller 302B. As shown in FIG. 10, each of the first, second, third, and fourth masks 308A-D are distanced from the substrate in this starting state.

Figure 11:
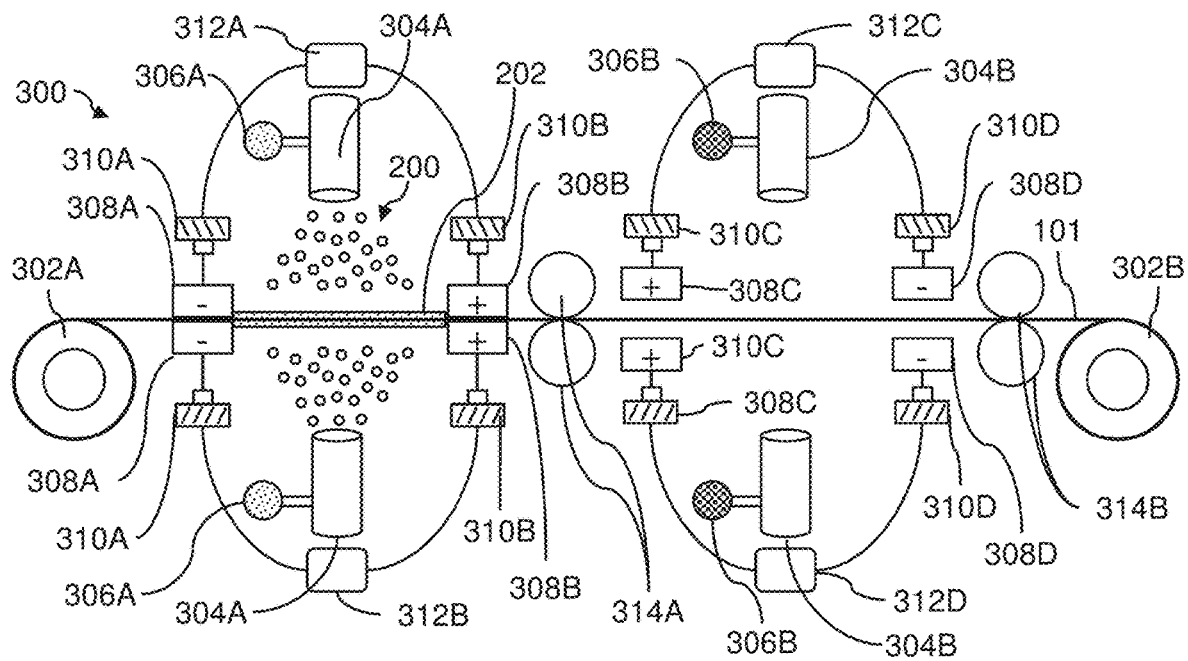
FIG. 11 is a side schematic representation of the spray deposition system of FIG. 10 during a material deposition process.

FIG. 11 depicts the spray deposition system of FIG. 10 during a first material layer 202 deposition. As shown in FIG. 11, the first masks 308A and second masks 308B have been moved to contact the substrate. Accordingly, bare regions of the substrate disposed underneath the first and second masks are shielded such that these regions are maintained in a bare uncoated state as first particles 200 are fed from the first reservoirs 306A and are sprayed from the first sprayers 304A towards the substrate to form first material layers 202 on opposing sides of the substrate. Similarly to the embodiment of FIGS. 1-7, the first sprayers 304A may electrically charge the first particles 200, so that the particles are attracted to the substrate and evenly disperse between the first masks and second masks. According to the embodiment of FIGS. 10-13, the substrate may be configured to be heated resistively. As shown in FIG. 11, the first masks 308A may function as a negative, grounded, or low potential electrode and the second masks 308B may function as a positive or high potential electrode, so that current is passed from the second masks to the first masks through the substrate to heat the substrate. Thus, the first masks and second masks both shield bare regions from material deposition and function as a heater for the substrate. Of course, while the embodiment of FIG. 11 is configured to pass current from the second masks to the first masks, the direction of current may be reversed in other embodiments (i.e., with the first masks having a positive or high potential and the second masks having a negative, grounded, or low potential), as the present disclosure is not so limited.

Figure 12:
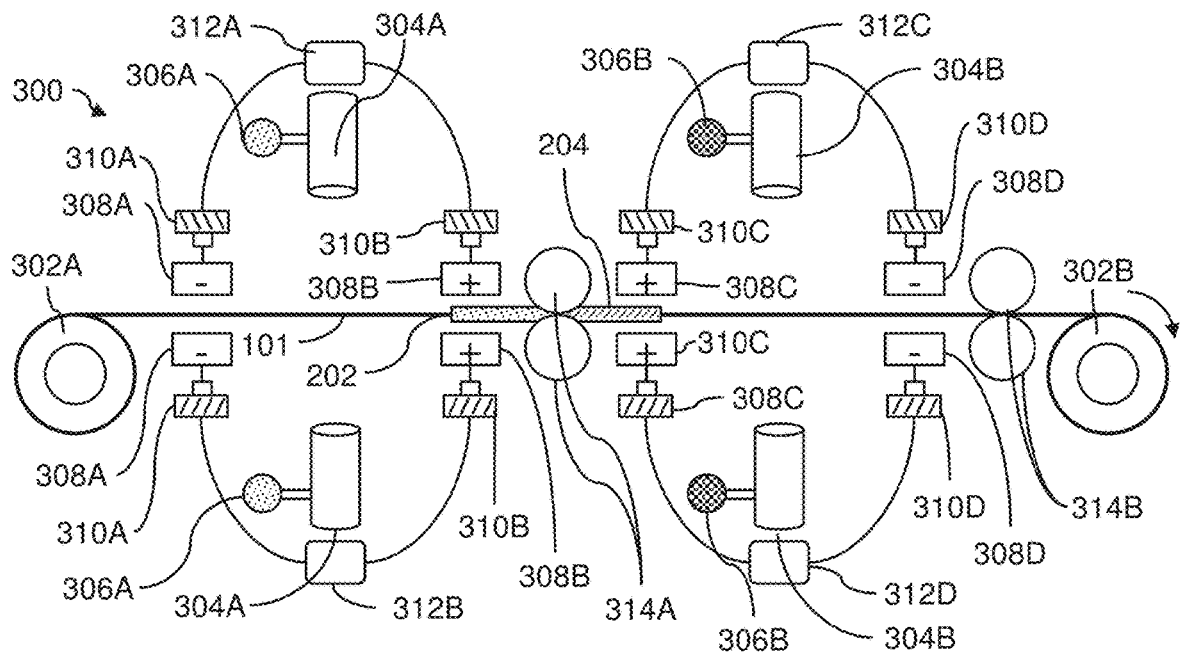
FIG. 12 is a side schematic representation of the spray deposition system of FIG. 10 during a material deposition process.

Once a sufficient amount of the first particles 200 have been deposited into a first material layer 202, the spray deposition system proceeds to the state shown in FIG. 12. As shown in FIG. 12, the first masks 308A and second masks 308B have been moved to a distanced non-contacting position relative to the substrate by the first mask actuators 310A and the second mask actuator 310B. The second masks 308B may be distanced from the substrate by a dimension sufficient for the second masks to clear the first material layer 202 as the first roller 302A and second roller 302B translate the first material layer and substrate through the first calendering rollers 314A towards the second deposition station. The first and second rollers move the substrate until a desired portion of the substrate is disposed between the third masks 308C and the fourth masks 308D, which may be arranged and separated from one another by a distance equal to that of the separation between the first masks and second masks. Accordingly, the third masks and fourth masks may be aligned with the corresponding bare regions of the substrate previously covered by the first masks and second masks as the spray deposition system proceeds to the state shown in FIG. 13.

Figure 13:
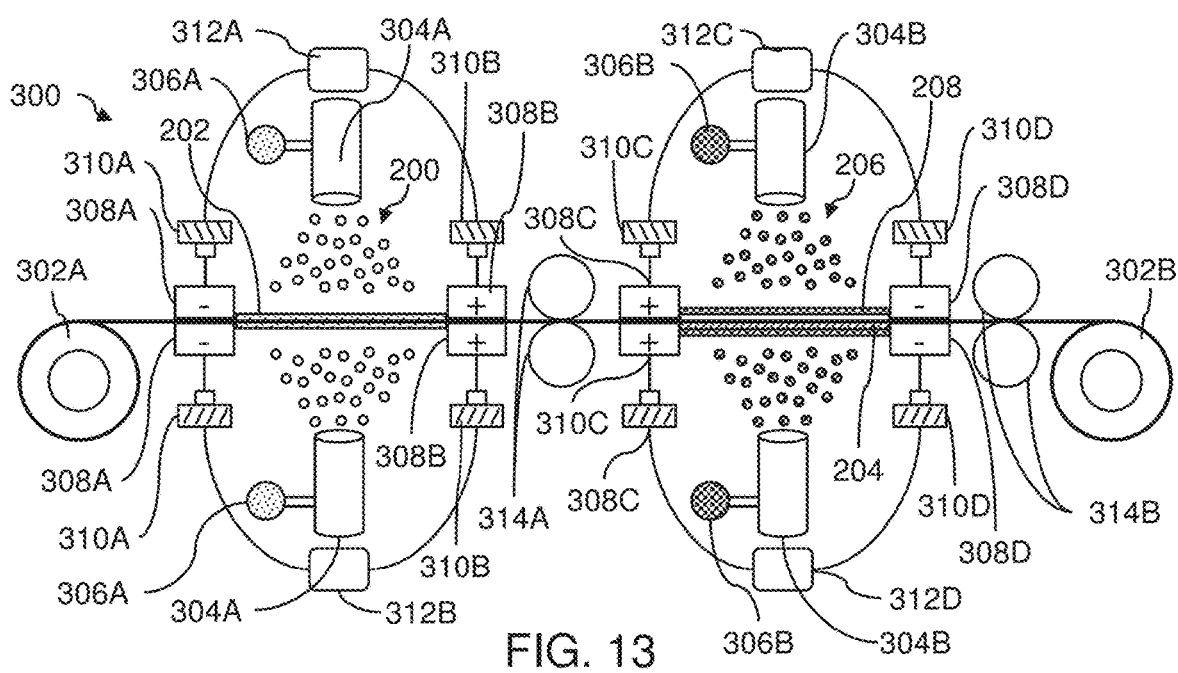
FIG. 13 is a side schematic representation of the spray deposition system of FIG. 10 during a material deposition process.

As shown in FIG. 13, the previously deposited first material layer 202 has been moved to be aligned between the third masks 308C and fourth masks 308D. The rollers then stop the substrate, so that additional material layers may be deposited and the masks may be moved to contact the substrate in the bare portions of the substrate aligned with the masks. As shown in FIG. 13, the third masks 308C and fourth masks 308D have been moved into contact with the substrate 101 by the third mask actuators 310C and fourth mask actuators 310D, respectively, so that the substrate is grasped by the third and fourth masks. Likewise, the first masks 308A and second masks 308B have also been moved into contact with another portion of the substrate by the first mask actuators 310A and second mask actuators 310B. Accordingly, each of the first, second, third, and fourth masks are in direct contact with and shield the corresponding portions of the substrate while particles are deposited from the first sprayers 304A and the second sprayers 304B onto the substrate. As shown in FIG. 13, the first sprayers deposit first particles 200 onto opposing sides of the substrate to form an additional first material layer on the substrate. Meanwhile, the second sprayers 304B deposit second particles 206 fed from the second reservoirs 306B onto the opposing calendered first material layers 204 to form second material layers 208 on opposing sides of the substrate. When the layer is subsequently translated through the system towards the second roller 302B, the substrate as well as the first and second layers may pass through the second calendering rollers 314B prior to being wound onto the second rollers.

As shown in FIG. 13, multiple material layers may be deposited simultaneously at the separate stations. As noted previously, the substrate may be resistively heated in the target regions as the particles are deposited on the substrate. According to the embodiment of FIGS. 10-13, the third masks 308C and fourth masks 308D may be configured as electrodes which pass a current through the substrate at the second station of the spray deposition system. However, to avoid resistive heating of the substrate between adjacent deposition systems (e.g. between the second and third masks), the third masks and fourth mask may pass a current in an opposite direction than that of the first masks 308A and second masks 308B. That is, as shown in FIG. 13, the second masks 308B and third masks 308C may be configured as positive or high potential electrodes, whereas the first masks 308A and fourth masks 308D may be configured as negative, grounded, or low potential electrodes. Accordingly, current may pass from the second masks or third masks outward in opposite directions towards either the first masks or fourth masks respectively. Therefore, the masks adjacent to one other between the first station and second station may have an equal potential, so that current is not passed from the third masks to the second masks. Thus, this arrangement of masks may allow current to be passed through the substrate exclusively in target regions which are subject to particle deposition as opposed to heating the entirety of the substrate. Such a configuration may reduce energy consumption or otherwise improve the efficiency of the spray deposition process. In addition to the above, in embodiments where rollers are not used between sequentially located deposition stations where material is sprayed onto two or more adjacent target regions of a substrate, a single mask may be disposed between adjacent target regions and may function as an electrode for heating both target regions due to the use of alternating high and low potential masks located along a length of the substrate.

In view of the above, it should be noted that the masks may be arranged with any suitable positive, negative, relative potential, or grounded potential so as to isolate current passage through the target regions of a substrate. Furthermore, in other embodiments, additional stations may be added to the spray deposition system with the masks in adjacent stations sharing an equivalent or similar potential so as to inhibit current transmission through the substrate between the stations. However, in some embodiments, the current may not be isolated to particular stations and any desired portion of the substrate such any length, and potentially the entire, substrate may be resistively heated as the present disclosure is not limited to embodiments where resistive heating of the substrate is limited to being within the confines of the one of more deposition stations of the system.

The process may continue to perform deposition cycles and cyclically move the substrate through the system as shown in FIG. 13 until a supply of substrate is exhausted. That is, the first, second, third, and fourth masks 308A-D may be moved out of contact with the substrate and the first roller 302A and second roller 302B may feed the first material layer 202 through the first calendering rollers 314A and the second material layer 208 through second calendering rollers 314B. Accordingly, after the second material layer is calendered, it may be wound onto the second roller 302B. The first and second rollers may stop the substrate when the next uncoated first material layer 202 is aligned between the third and fourth masks so that the state of FIG. 14 may be repeated. Thus, the spray deposition system may perform a semi-continuous process by advancing the substrate, stopping, depositing material layers, and advancing the substrate again. The resulting material formed may have a sequence of regions having first material layers 202 and second material layers 208 disposed on top of the first material layers separated by bare regions of the substrate.

While the embodiment of FIGS. 10-13 is shown having multiple stations which deposit material layers in sequence after moving the substrate 101 between the stations, in other embodiments the stations may be combined into a single station where multiple material layers are deposited without moving the substrate. For example, in some embodiments, multiple reservoirs of materials may be coupled to one or more sprayers so that a first material layer may be deposited and then a second material layer may be deposited afterward without moving the substrate or any masks contacting the substrate. In another embodiment, multiple sprayers coupled to separate reservoirs may be proximate one another so that both effectively target the same region of the substrate. In this embodiment, a first sprayer may deposit a first material layer and a second sprayer may deposit a second material layer on top of the first material layer without moving the substrate. Of course, a spray deposition system may use any suitable number of stations, sprayers, reservoirs, and masks, as the present disclosure is not so limited.

Figure 14:
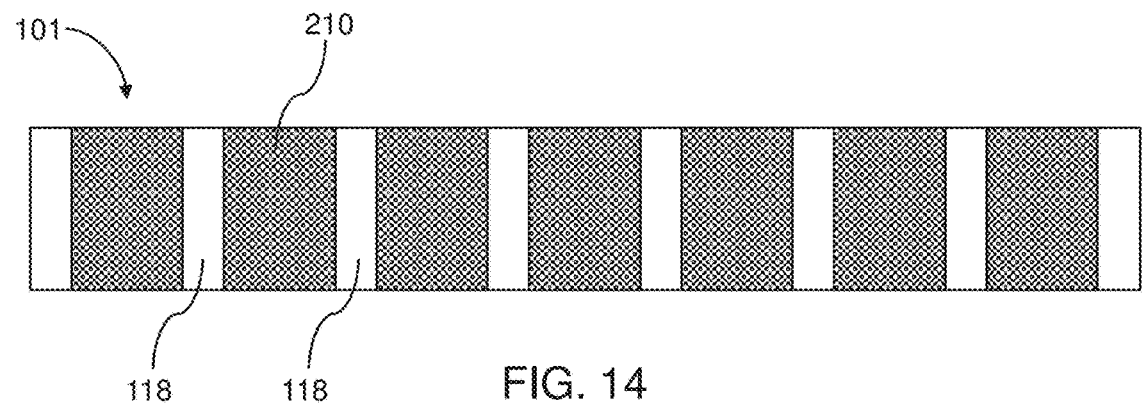
FIG. 14 is a top schematic representation of a material produced by the spray deposition system of FIG. 10.
Figure 15:
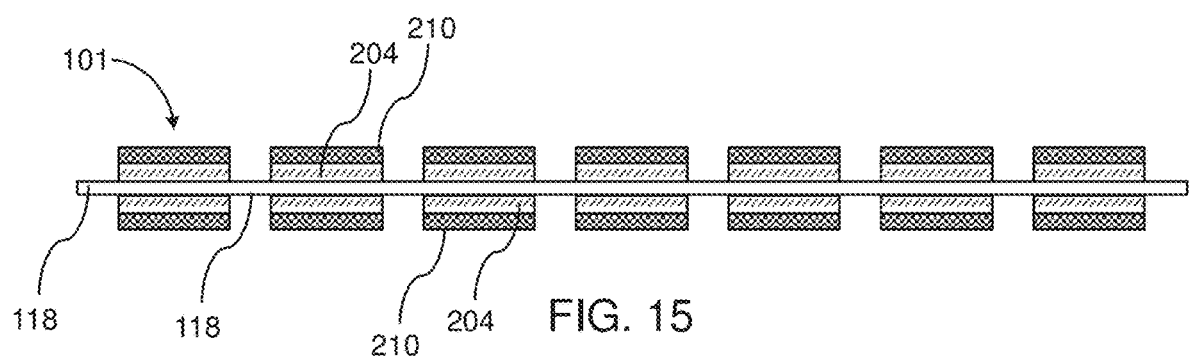
FIG. 15 is a side schematic representation of the material of FIG. 14.

FIGS. 14-15 are top and side schematic representations, respectively, of a material produced by the spray deposition system of FIGS. 10-13. As shown in FIGS. 14-15, calendered second material layers 208 are disposed on top of calendered first material layers 204 which are disposed on opposing sides of a substrate 101. Each section of calendered first material layer and second material layer is separated from the adjacent sections of deposited material layers by a bare region 118 of the substrate. As noted previously, such an arrangement improves manufacturing processes in which is desirable to easily separate the segments of material layers and/or join the substrate to another structure such as an electrical lead (e.g., by welding or soldering).

In some embodiments, the material of FIGS. 14-15 may be used to form multiple separate electrodes. In this embodiment, the calendered first material layer 204 may be formed using an electrochemical material (i.e., an anode or cathode material). In such an embodiment, the calendered second material layer 210 may be a separator and/or solid state electrolyte layer. In other embodiments, the first calendered material layer may also include a binder and/or a solid state electrolyte. Of course, any suitable material or mixture of materials may be used to form the calendered first material layer and second material layer, as the present disclosure is not so limited.

Figure 16:
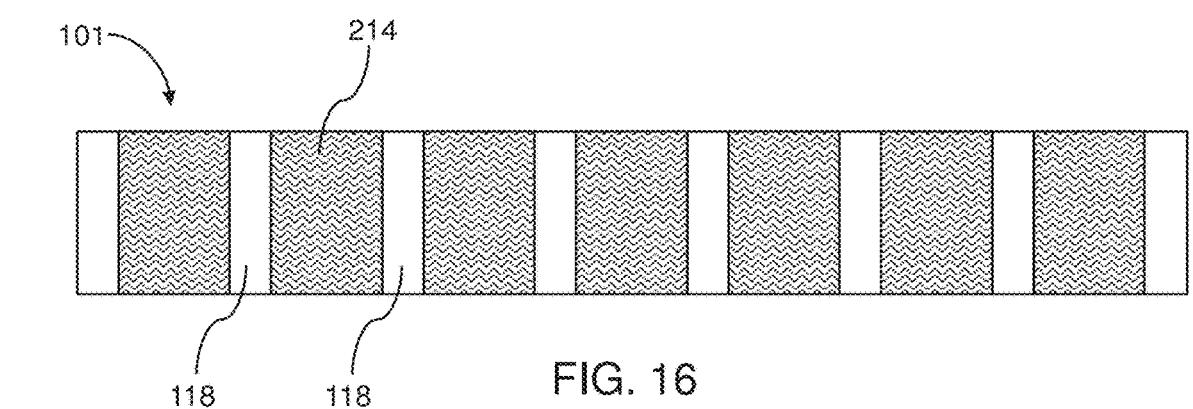
FIG. 16 is a top schematic representation of one embodiment of a material produced by a spray deposition system.
Figure 17:
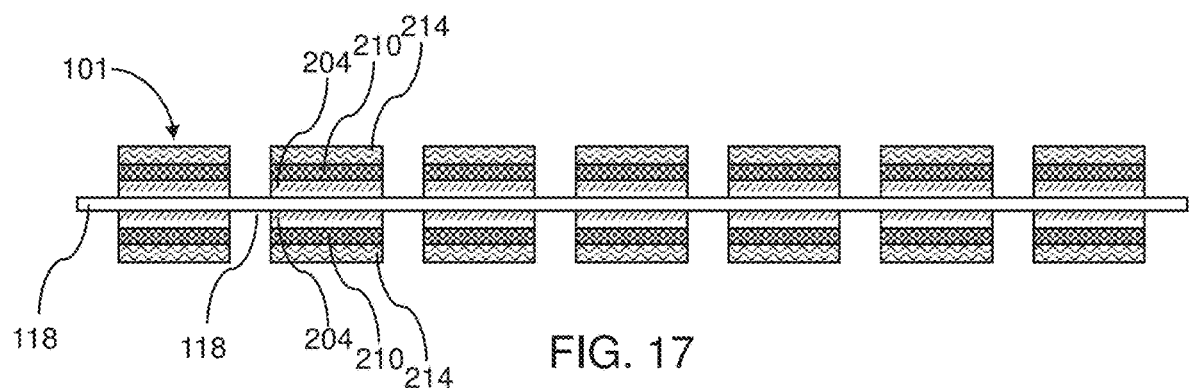
FIG. 17 is a side schematic representation of the material of FIG. 16.

FIGS. 16-17 are top and side schematic representations of one embodiment of a material produced by a spray deposition system. The material of FIGS. 16-17 is similar to that of FIGS. 14-15, having a calendered first and second material layers 204 and 210. Additionally, a calendered third material layer 214 may be disposed atop the second material layers located on opposing sides of the substrate. In one embodiment, the first material layer 204 may include an electrochemical material to form a first electrode layer (e.g. an anode or cathode). Correspondingly, the second material layer 210 may be an ionically conductive material to form a solid state electrolyte or a separator material to form a separator layer. The third material layer may be a second electrode layer comprising a different electrochemical material than that of the first electrode layer. Such an arrangement may be useful for forming multiple battery electrodes on a single substrate prior to use in subsequent battery formation processes. Of course, while specific material layers are discussed above, any materials or material mixtures may be deposited in any desirable order and in any number of layers as the present disclosure is not so limited.

Figure 18:
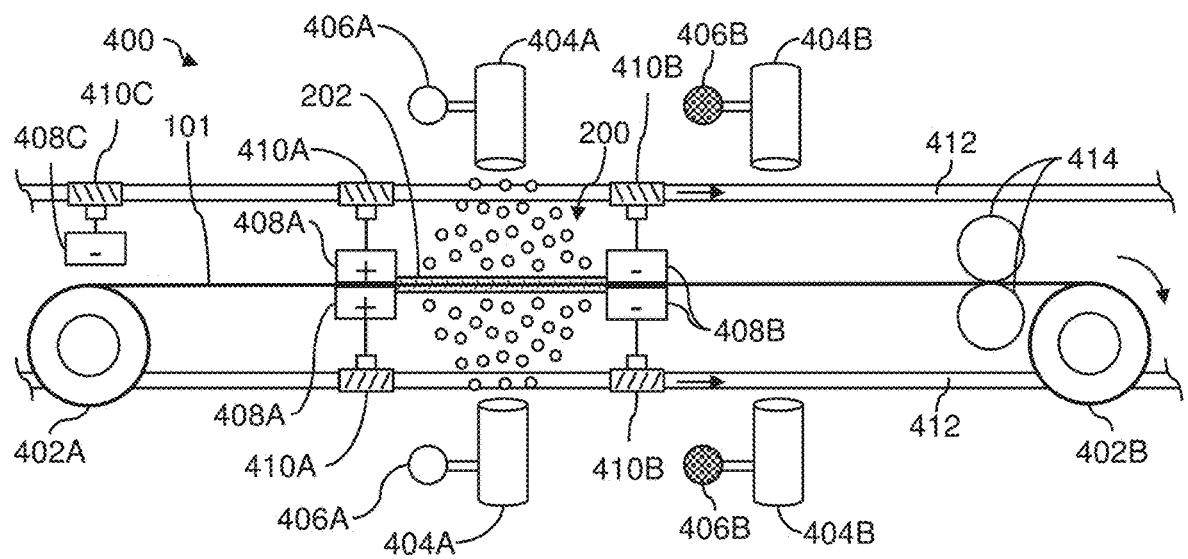
FIG. 18 is a side schematic representation of yet another embodiment of a spray deposition system during a material deposition process.

FIGS. 18-21 are side schematic representations of yet another embodiment of a spray deposition system 400 during a material deposition process. In contrast to the previously described embodiments which performed a non-continuous or semi-continuous process, the spray deposition system of FIGS. 18-21 is configured to form material layers on a substrate 101 in a continuous process where the substrate is constantly unwound from a first roller 402A and wound onto a second roller 402B. As shown in FIG. 18, the spray deposition system includes first sprayers 402A coupled to first reservoirs 406A that direct sprays of material towards opposing surfaces of the substrate in a first target region and second sprayers 404B coupled to second reservoirs 406B that direct sprays of material towards opposing surfaces of the substrate in a second target region. The first and second sprayers deliver first particles and second particles, respectively. The spray deposition system also includes first masks 408A and second masks 408B which are controlled by first mask actuators 410A and second mask actuators 410B. The first mask actuators and second mask actuators are operatively coupled to tracks 412 which are configured to allow the masks to move in sync with the substrate while maintaining contact with the substrate to shield bare regions of the substrate as the first particles and second particles are deposited. In some embodiments, the tracks 412 may be continuous, so that masks are repeatedly recirculated within the system to mask the substrate as the substrate is moved from the first roller to the second roller. The masks actuators may be linked via a chain, belt, or other appropriate structure which maintains a predetermined distance between each of the masks so that material layers are deposited in equal length segments. Of course, the masks may be separated by any appropriate equal, non-equal distances, and/or variable distances as the present disclosure is not so limited. As shown in FIG. 18, third masks 408C and third mask actuators 410C are following the first masks and second masks along the track.

According to the state shown in FIG. 18, the first masks 408A and second masks 408B have grasped the substrate 101 to effectively mask bare regions of the substrate shielded by the masks. The first masks and second masks define a target region of the substrate between them where the material layers are deposited. As shown in FIG. 18, as the target region between the first masks and second masks traverses across the first sprayers 404A, the first sprayers deposit first particles 200 onto the substrate to form a first material layer. While the first particles flow from the first reservoirs 406A, they may be charged by the first sprayer 404A, and sprayed onto the substrate to form the first material layer. The substrate, first masks, and second masks may move at a constant speed from the first roller toward the second roller. According to this embodiment, the thickness of the first material layer may be controlled by the deposition rate of material emitted from the first sprayer 404A, a speed of the substrate 101, and/or other appropriate control parameters. While the first particles 200 are being ejected from the first sprayer, the substrate may be heated resistively by current passed through the first masks and second masks. According to some embodiments, and as shown in FIG. 18, the masks may be arranged with alternating potentials to ensure current is passed through each target region to heat the target region as it passes underneath one of the first sprayers 404A and second sprayers 404B. More specifically, the first masks have a positive or otherwise high potential and the second masks and third masks have a negative, grounded, or lower potential so that current flows from the first masks to the second masks and/or third masks. That is, in the state shown in FIG. 18, current is passed from the first masks to the second masks and from the third masks to the first masks.

Figure 19:
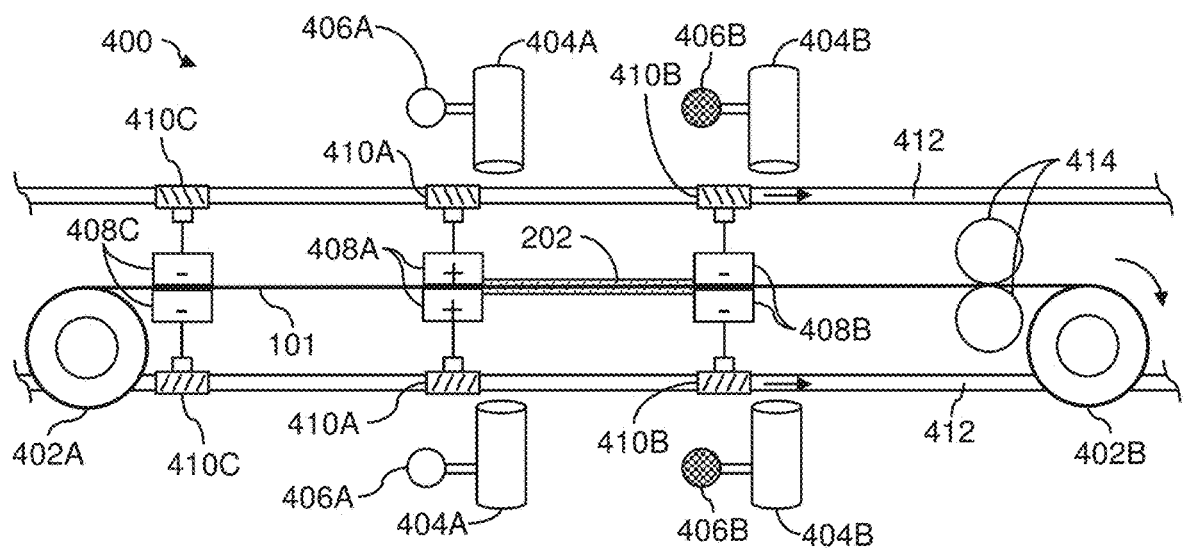
FIG. 19 is a side schematic representation of the spray deposition system of FIG. 18 during a material deposition process.

FIG. 19 depicts a continuation of the spray deposition process from the state shown in FIG. 18. As shown in FIG. 19, the first material layer 202 has been deposited and the first sprayers 404A have ceased spraying. The substrate 101, first masks 408A, second masks 408B, and third masks 408C have moved further toward the second roller 402B. Once the third mask 408C is suitably adjacent the substrate, the third mask actuators 410C may move the third masks into contact with the substrate to grasp the substrate and define another target region of the substrate between the first masks and the third masks. As noted previously, each of the masks defines a bare region which is covered or shielded from the materials sprayed by the first sprayers 404A and second sprayers 404B.

It should be noted that while mask actuators are employed in the embodiment of FIGS. 18-21, the masks may be moved into or out of contact with the substrate using the track. For example, in some embodiments, the track may move the masks closer to the substrate along a particular portion of the track and move the masks further away from the substrate along other portions of the track to control relative movement of the masks relative to the substrate. Thus, these track portions may be arranged so that the masks are passively brought into and out of contact with regions of the substrate that are to be masked during a deposition process. In some embodiments, mask actuators may be combined with various track shapes to move the masks in any desirable direction relative to the substrate, as the present disclosure is not so limited.

Figure 20:
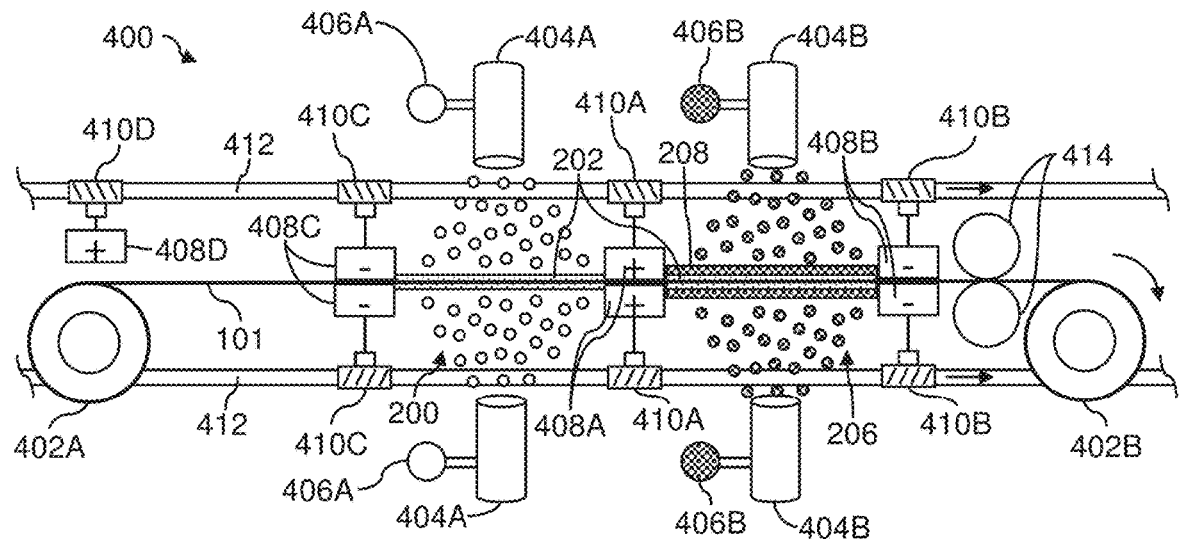
FIG. 20 is a side schematic representation of the spray deposition system of FIG. 18 during a material deposition process.

FIG. 20 continues the material deposition process from the state of the spray deposition system 400 shown in FIG. 19. As shown in FIG. 20, the substrate 101, first masks 408A, second masks 408B, and third masks 408C have continued to move toward the second roller 402B in sync with one another. Each of the first, second, and third masks has maintained contact with the underlying substrate and has maintained bare regions where the substrate is contacted by the masks. In the state of FIG. 20, the target region of the substrate defined by the first and second masks is adjacent the second sprayers 404B, which correspondingly deposit second particles 206 from second reservoirs 406B onto the first material layer 202 to form a second material layer 208. Meanwhile, the target region of the substrate defined by the first and third masks is positioned adjacent the first sprayers which deposit first particles 200 into a first material layer disposed directly on the substrate. While each of these layers is being deposited, the substrate may be heated resistively by current passed from the first masks 408A to both the second masks 408B and the third masks 408C. Of course, in other embodiments, the direction of current passage may be reversed and passed from the third masks and second masks to the first mask, as the present disclosure is not so limited. As shown in FIG. 20, fourth masks 408D and fourth mask actuators 410D may follow the third masks along the track 412 to define yet another target region between the third masks and the fourth masks.

Figure 21:
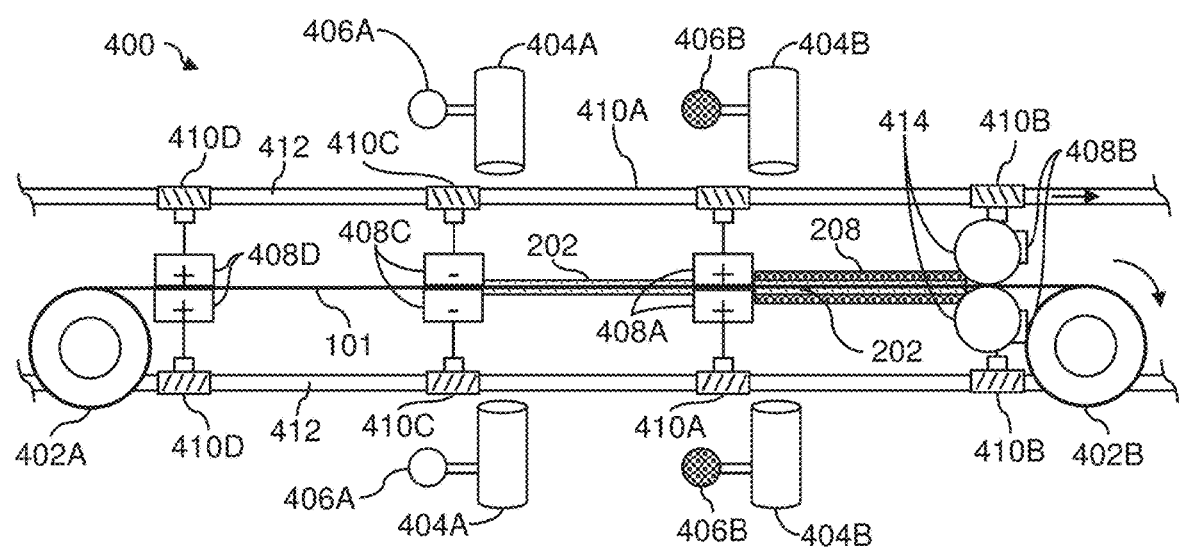
FIG. 21 is a side schematic representation of the spray deposition system of FIG. 18 during a material deposition process.

FIG. 21 depicts the material deposition process following on the state shown in FIG. 20. As shown in FIG. 21, the substrate 101, first masks 408A, second masks 208B, third masks 408C, and fourth masks 408D have moved further toward the second roller 402B. The deposition of the second material layer 208 between the first and second masks has been completed and the second masks have been moved out of contact with the substrate by the second mask actuators 410B. The released portion of the substrate including the second material layer 208 and first material layer 202 are fed into calendering rollers 414 which densify the first and second material layers simultaneously prior to winding the substrate onto the second roller 402B. As the second masks have released the substrate, the fourth masks 408D have been moved into contact with the substrate by the fourth mask actuators 410D. Accordingly, the third masks 408C and fourth masks 408D may define yet another target region between them for material deposition.

While the embodiment shown in FIGS. 18-21 depicts timing the first and second sprayers 404A, 404B so that material is deposited in bursts (i.e., non-continuously), in other embodiments the first sprayers and second sprayers may deposit material constantly. That is, first particles and second particles may be ejected continuously from the first sprayers and second sprayers as the substrate and masks move from the first roller 402A toward the second roller 402B. According to this embodiment, the sprayers may spray particles directly at the substrate as the masks and substrate pass underneath the sprayers and are located in a desired range. However, as the masks shield the underlying substrate, bare regions of the substrate may still be maintained underneath the masks in such an arrangement.

Figure 22:
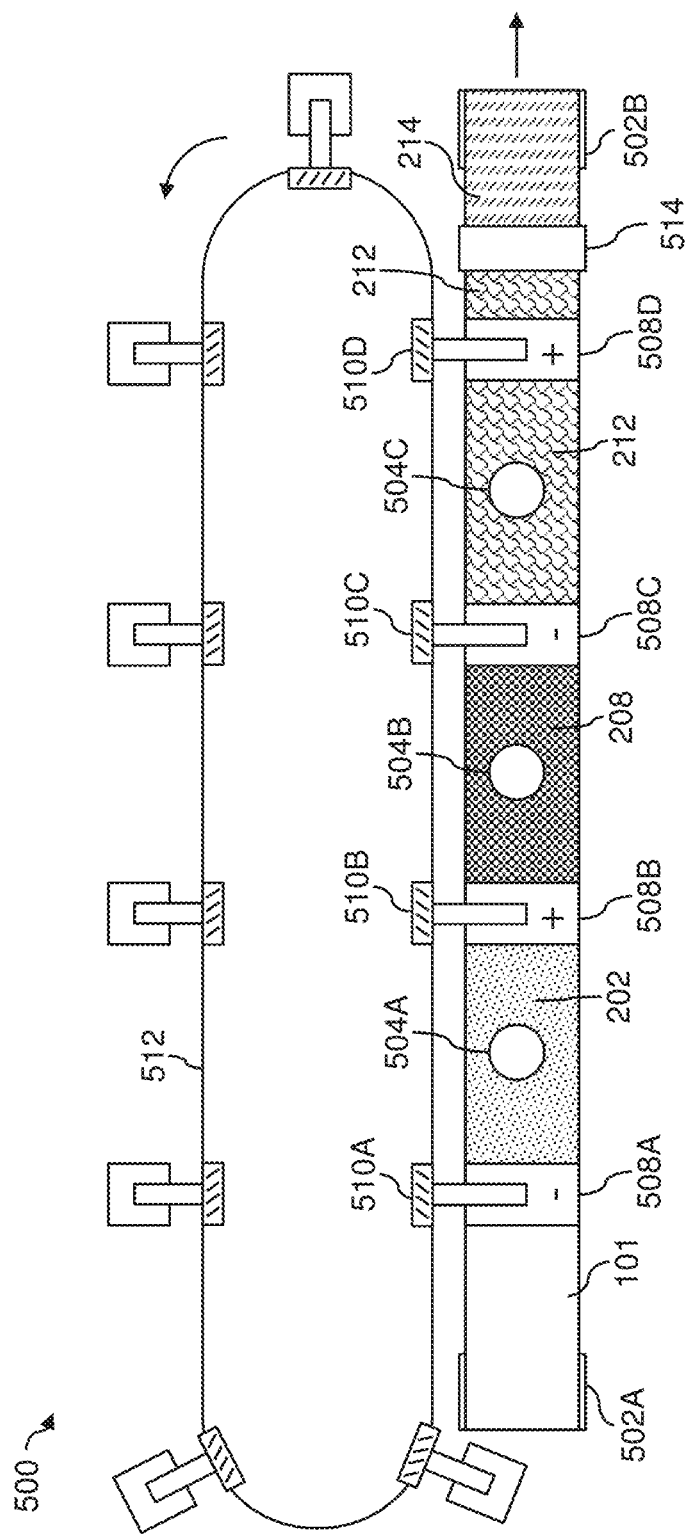
FIG. 22 is a top schematic representation of yet another embodiment of a spray deposition system during a material deposition process.

FIG. 22 is a top schematic representation of yet another embodiment of a spray deposition system 500 during a continuous material deposition process. According to the embodiment of FIG. 22, the spray deposition system is similar to that of FIGS. 18-21, except that the system deposits three material layers in sequence at different stations. As shown in FIG. 22, the system includes a first roller 502A and a second roller 502B which translates a substrate 101 by unwinding the substrate from the first roller and winding the substrate onto the second roller in a reel-to-reel process. The system includes a first sprayer 504A, second sprayer 504B, and third sprayer 504C which each deposit different materials or material mixtures on the substrate in sequence. The system also includes a plurality of masks 508 and mask actuators 510 arranged on a continuous track 512 which allows masks to be moved into or out of contact with the substrate in a continuous motion. For clarity, the masks and mask actuators in contact with the substrate are labeled as a first mask 508A, first mask actuator 510A, second mask 508B, second mask actuator 510B, third mask 508C, third mask actuator 510C, fourth mask 508D, and fourth mask actuator 510D. As noted previously with reference to the embodiment of FIGS. 18-21, the masks define target regions between them for material deposition, where each target region will be separated from adjacent target regions by a bare region of the substrate shield by the masks. According to the embodiment of FIG. 22, the first mask 508A and the third mask 508C are configured as grounded, negative, or otherwise low potential electrodes. In contrast, the second mask 508B and fourth mask 508D are configured as positive or otherwise high potential electrodes, so that electrical current flows from the second and fourth electrodes to the first and third electrodes, respectively, to resistively heat the substrate as material is deposited by each of the sprayers.

As shown in the embodiment of FIG. 22, the spray deposition system deposits three distinct material layers which are calendered simultaneously before being wound onto the second roller 502B. That is, as the substrate passes the first sprayer 504A, a first material layer 202 is formed on the substrate. As the substrate continues and is positioned adjacent the second sprayer 504B, the second sprayer deposits a second material layer 208 on top of the first material layer. Continuing on, the substrate moves adjacent the third sprayer 504C which deposits a third material layer 212 on top of the second material layer. After the third material layer is deposited, the mask nearest the calendering rollers 514 (which in the state shown in FIG. 22 is the fourth mask 508D) is moved out of contact with the substrate and the substrate including the three layers is passed through the calendering rollers 514. As the three layers are calendered, they are densified simultaneously to yield a calendered three-layer composite which is wound onto the second roller 502B. As noted previously, the three layers may include any desirable materials or mixtures of materials, as the present disclosure is not so limited.

It should be noted that while an ovular track is shown and described with reference to the embodiment of FIG. 22, it should be understood that a track may have any appropriate shape, and any number of tracks may be used for handling the masks of a system, as the disclosure is not limited to any particular number and/or arrangement of tracks within a system. Further, in some embodiments, a spray deposition system may include multiple short tracks associated with multiple sprayers. In this embodiment, masks may move to a starting position of the track, contact the substrate and move with the substrate concurrently until the end of the track. When the mask reaches the end of the track, the mask may move out of contact with the substrate and travel in a direction opposite to a direction of travel of the substrate to return to the starting position of the track. Thus, the disclosed systems may include any suitable track type and/or number of tracks as the present disclosure is not so limited.

Figure 23:
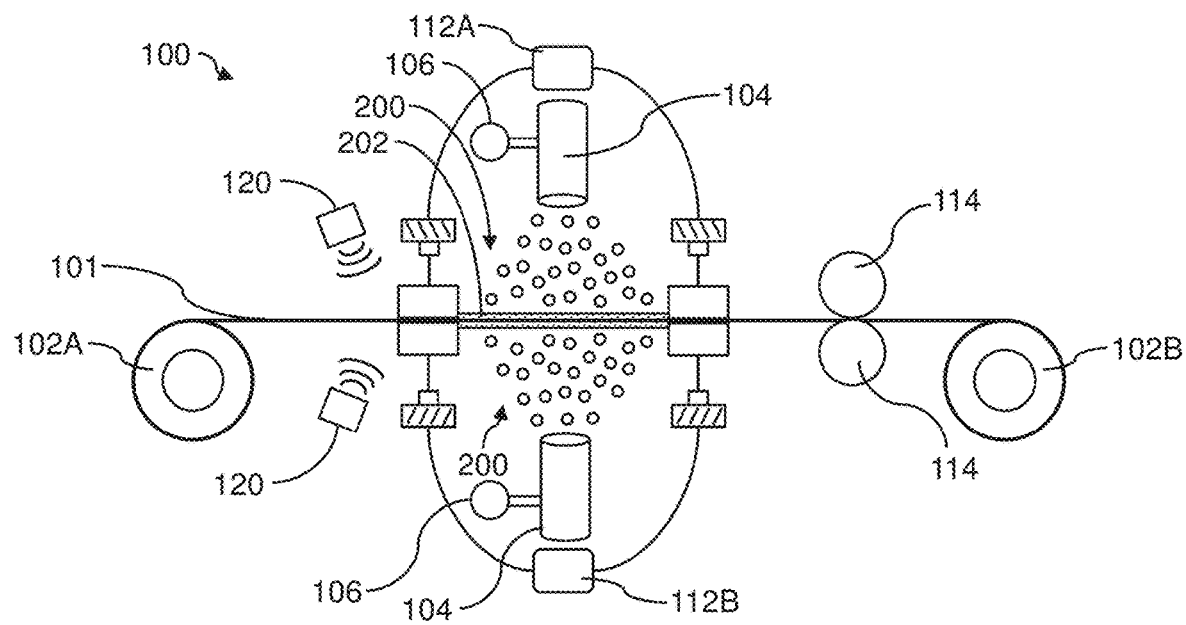
FIG. 23 is a side schematic representation of yet another embodiment of a spray deposition system during a material deposition process.

FIG. 23 is a side schematic representation of yet another embodiment of a spray deposition system 100 during a material deposition process. The embodiment of FIG. 23 is similar to that of FIGS. 1-7, except that instead of resistively heating the substrate the spray deposition system heats the substrate using multiple radiant heaters 120. As shown in FIG. 23, the radiant heaters may be disposed on one or both sides of a substrate 101 such that they radiate heat towards the substrate so that the substrate is effectively heated as first particles 200 are deposited on the substrate from sprayers 104.

Figure 24:
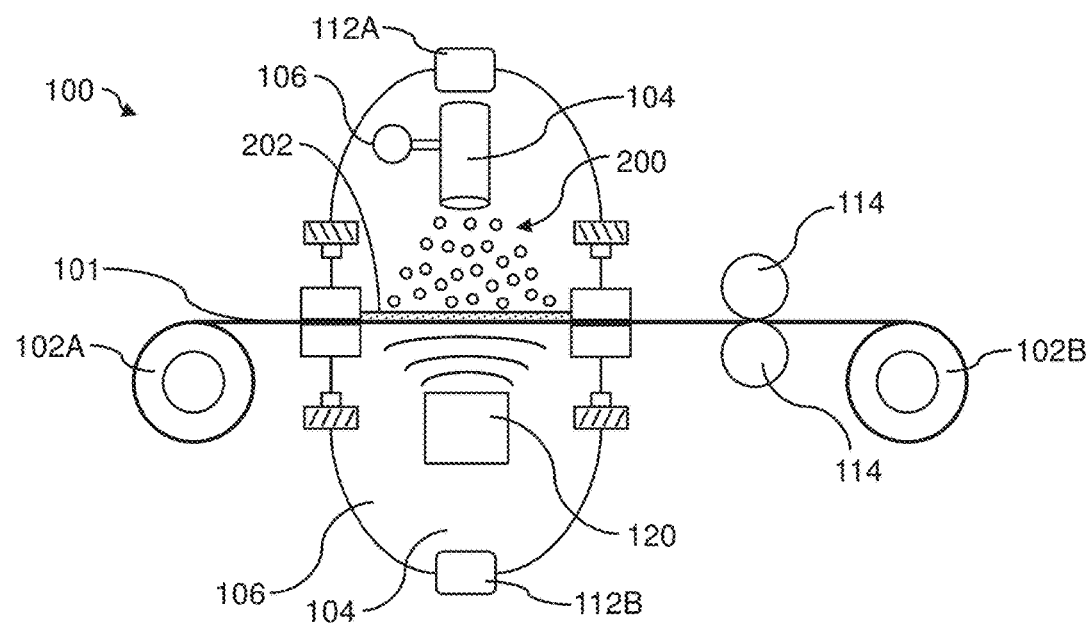
FIG. 24 is a side schematic representation of yet another embodiment of a spray deposition system during a material deposition process.

FIG. 24 is a side schematic representation of yet another embodiment of a spray deposition system 100 during a material deposition process. Like the embodiment of FIG. 23, the spray deposition system of FIG. 24 employs a radiant heater which radiates heat to a substrate 101 as first particles 200 are deposited on the substrate. In contrast to the embodiment of FIG. 23, the radiant heat is directed to a first side of the substrate and the first particles are deposited in a first material layer 202 on a second side opposite the first side. Such an arrangement may promote even consistent heating of the substrate within a target region as compared to heaters that heat a substrate prior to being moved to be within a target region.

It should be understood that aspects of the various embodiments described herein may be combined or substituted. Further, the exemplary embodiments of spray deposition systems disclosed herein may deposit single layers or material layers onto a single side of a substrate or two opposing sides of a substrate. Additionally, the disclosed spray deposition systems may deposit material layers on a substrate as part of a non-continuous, semi-continuous, or continuous process. The disclosed spray deposition systems may also employ actuators which move individual masks into or out of contact with a substrate or combined actuators which move multiple masks simultaneously. Finally, the disclosed spray deposition systems may deposit multiple material layers in sequence either at a single station at different times and/or at distinct physically separated deposition systems as the disclosure is not so limited.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method for depositing material layers, the method comprising:
   grasping a first region of a substrate with a first clamp to mask the first region of the substrate;
   heating the substrate; and
   spraying first particles comprising at least one selected from the group of an electrochemical material, an ionically conductive material, an electrically conductive material, and a separator material towards the heated substrate to form a first layer on the substrate, wherein the substrate is a current collector for an electrochemical cell.

2. The method of claim 1, wherein spraying the first particles towards the heated substrate includes spraying the first particles towards a first side of the substrate and a second side of the substrate opposite the first side.

3. The method of claim 1, wherein heating the substrate includes passing a current through the substrate via the first clamp contacting the substrate and a second mask contacting the substrate to resistively heat the substrate.

4. The method of claim 1, further comprising grasping a second region of the substrate with a second clamp to mask the second region of the substrate.

5. The method of claim 4, further comprising moving at least a portion of the substrate relative to the first clamp and the second clamp.

6. The method of claim 4, further comprising moving the substrate while the first particles are sprayed towards the heated substrate.

7. The method of claim 6, wherein the first clamp and the second clamp move in sync with the substrate.

8. The method of claim 6, wherein moving the substrate includes a first roller and a second roller, wherein the first roller and the second roller are configured to move the substrate such that at least a portion of the substrate moves from the first roller toward the second roller, wherein the substrate is unwound from the first roller and wound onto the second roller.

9. The method of claim 1, further comprising calendering the first layer.

10. The method of claim 1, wherein the first particles further comprise a binder.

11. The method of claim 1, further comprising spraying second particles onto the first layer to form a second layer disposed on the first layer.

12. The method of claim 1, wherein grasping the substrate with the first clamp comprises actuating the first clamp with an actuator, wherein the actuator is a pneumatic, hydraulic, or electric actuator.

13. A method of forming an electrode comprising:
    masking a first region of a substrate to inhibit material deposition on the substrate in the first region, wherein masking the first region of the substrate includes grasping the first region of the substrate with a first clamp;
    masking a second region of the substrate to inhibit material deposition in the second region, wherein masking the second region of the substrate includes grasping the second region of the substrate with a second clamp;
    applying first particles comprising at least one selected from the group of an electrochemical material, an ionically conductive material, an electrically conductive material, and a separator material to the substrate to form a first layer; and
    applying second particles comprising at least one selected from the group of the electrochemical material, the ionically conductive material, the electrically conductive material, and the separator material to the first layer to form a second layer disposed on the first layer.

14. The method of claim 13, wherein applying the first particles and the second particles includes spraying the first particles towards the substrate and spraying the second particles towards the first layer.

15. The method of claim 13, wherein the first particles include the electrochemical material and the second particles include the separator and/or the ionically conductive material.

16. The method of claim 13, further comprising sequentially calendering the first layer and the second layer.

17. The method of claim 16, wherein calendering the first layer and the second layer includes moving at least a portion of the substrate from a first roller toward a second roller, wherein the substrate is unwound from the first roller and wound onto the second roller.

18. The method of claim 13, further comprising calendering the first layer and the second layer simultaneously.

19. The method of claim 18, wherein calendering the first layer and the second layer includes moving at least a portion of the substrate from a first roller toward a second roller, wherein the substrate is unwound from the first roller and wound onto the second roller.

20. The method of claim 13, further comprising heating the substrate.

21. The method of claim 20, wherein heating the substrate includes passing a current through the substrate via a first mask contacting the substrate and a second mask contacting the substrate to resistively heat the substrate.

* * * * *